US012180763B2

(12) United States Patent
Lee

(10) Patent No.: US 12,180,763 B2
(45) Date of Patent: Dec. 31, 2024

(54) WINDOW ASSEMBLY HAVING HORIZONTAL CLOSING FUNCTION AND VENTILATION FUNCTION

(71) Applicant: CS TECH CO., LTD., Cheonan-si (KR)

(72) Inventor: Jae Son Lee, Cheonan-si (KR)

(73) Assignee: CS TECH CO., LTD., Cheonan-si (KR)

( * ) Notice: Subject to any disclaimer, the term of this patent is extended or adjusted under 35 U.S.C. 154(b) by 0 days.

(21) Appl. No.: 18/279,206

(22) PCT Filed: May 24, 2022

(86) PCT No.: PCT/KR2022/007381
§ 371 (c)(1),
(2) Date: Aug. 28, 2023

(87) PCT Pub. No.: WO2022/265247
PCT Pub. Date: Dec. 22, 2022

(65) Prior Publication Data
US 2024/0167308 A1 May 23, 2024

(30) Foreign Application Priority Data
Jun. 18, 2021 (KR) ........................ 10-2021-0079601

(51) Int. Cl.
*E05D 15/10* (2006.01)
*E05B 1/00* (2006.01)
(Continued)

(52) U.S. Cl.
CPC .............. *E05D 15/10* (2013.01); *E05B 1/003* (2013.01); *E05C 19/006* (2013.01); *E05D 15/06* (2013.01); *E05D 15/0669* (2013.01)

(58) Field of Classification Search
CPC . E05D 15/10; E05D 15/06; E05D 2015/1039; E05D 2015/0669;
(Continued)

(56) References Cited

U.S. PATENT DOCUMENTS 3,660,936 A * 5/1972 Bryson .................. E05D 15/10 49/449
5,836,111 A * 11/1998 Tak ......................... E05D 15/10 49/176
(Continued)

FOREIGN PATENT DOCUMENTS

EP 0683296 B1 1/2000
KR 10-2012-0050035 A 5/2012
(Continued)

OTHER PUBLICATIONS

English Translation of KR20130115958 (Year: n/a).*
International Search Report in International Application No. PCT/KR2022/007381, dated Aug. 16, 2022, 3 pages.

*Primary Examiner* — Justin B Rephann
(74) *Attorney, Agent, or Firm* — Park, Kim & Suh, LLC

(57) ABSTRACT

The present disclosure relates to a window assembly having a ventilation function and a horizontal close-fitting function, and more particularly to a horizontal close-fitting window assembly for implementing crime prevention and security functions by preventing a window from being open even in a ventilated state with the outside in which the window is slightly open and conveniently opening the window. The window assembly having a ventilation function and a horizontal close-fitting function includes a window sash, a window frame in which the window sash is installed to slide, a handle rotatably installed on the window sash, a latch provided on a side surface of the window sash and operatively connected to movement of the handle to move in up and down directions, a latching guide that is provided on the
(Continued)

window frame at a relative position facing the latch and by which the latch is or is not latched depending on a position of the latch, and a horizontal movement device provided on at least one of a top surface or a bottom surface of the window sash and operatively connected to the handle to cause horizontal close-fitting or horizontal close-fitting release of the window sash depending on movement of the handle, wherein the latching guide includes a first latching region positioned at an upper part, a second latching region located lower than the first latching region while being spaced apart from the first latching region, and a separation space provided between the first latching region and the second latching region, and a vertical central line of the first latching region and a vertical central line of the second latching region are displaced from each other, and when the latch is located in the first latching region or the second latching region, horizontal close-fitting or horizontal close-fitting release of the window frame is inducted, and when the latch is located in the separation space, the window sash is slidably moveable with respect to the window frame.

9 Claims, 19 Drawing Sheets

(51) Int. Cl.
*E05C 19/00* (2006.01)
*E05D 15/06* (2006.01)

(58) Field of Classification Search
CPC . E05D 15/0621; E05D 15/0665; E05D 15/56; E05D 2015/1028; E05B 1/003; E05C 19/006
See application file for complete search history.

(56) References Cited

U.S. PATENT DOCUMENTS

| | | | | | |
|---|---|---|---|---|---|
| 6,135,511 | A * | 10/2000 | Smith | E05C 9/063 292/156 |
| 9,316,045 | B2 * | 4/2016 | Kim | E06B 3/4618 |
| 10,047,552 | B2 * | 8/2018 | Lee | E05D 15/0665 |
| 10,077,594 | B2 * | 9/2018 | Fingerle | E05D 15/10 |
| 11,085,216 | B2 * | 8/2021 | Reich | E05D 15/10 |
| 11,098,513 | B2 * | 8/2021 | Liu | E06B 7/16 |
| 2002/0053166 | A1 * | 5/2002 | Fries | E06B 3/4627 49/213 |
| 2009/0038228 | A1 * | 2/2009 | Lee | E05D 15/10 49/506 |
| 2015/0052819 | A1 * | 2/2015 | Lee | E05D 15/0621 49/420 |
| 2018/0281569 | A1 * | 10/2018 | Otsubo | B60J 1/18 |
| 2019/0292828 | A1 * | 9/2019 | Liu | E05B 3/00 |
| 2021/0317692 | A1 * | 10/2021 | Beutel | E05D 15/0665 |
| 2021/0404246 | A1 * | 12/2021 | Lee | E05D 15/56 |

FOREIGN PATENT DOCUMENTS

| | | | |
|---|---|---|---|
| KR | 10-1142795 | B1 | 5/2012 |
| KR | 10-1254327 | B1 | 4/2013 |
| KR | 10-2013-0115958 | A | 10/2013 |
| KR | 10-2016-0033690 | A | 3/2016 |
| KR | 10-1731775 | B1 | 4/2017 |
| KR | 10-2373584 | B1 | 3/2022 |

* cited by examiner

WINDOW ASSEMBLY HAVING HORIZONTAL CLOSING FUNCTION AND VENTILATION FUNCTION

CROSS-REFERENCE TO RELATED APPLICATIONS

This application is a National Phase Application of PCT International Application No. PCT/KR2022/007381, which was filed on May 24, 2022, and which claims priority from Korean Patent Application No. 10-2021-0079601 filed on Jun. 18, 2021. The disclosures of the above patent applications are incorporated herein by reference in their entirety.

TECHNICAL FIELD

The present disclosure relates to a window assembly having a ventilation function and a horizontal close-fitting function, and more particularly to a horizontal close-fitting window assembly for implementing crime prevention and security functions by preventing a window from being open even in a ventilated state with the outside in which the window is slightly open and conveniently opening the window.

BACKGROUND ART

In general, a window assembly serves as a wall separating indoors and outdoors, and at the same time, allows sunlight and fresh air from the outside to be introduced to allow indoor ventilation, and also provides a view of the outside and a sense of openness. The window assembly is largely classified into a casement window assembly and a sliding window assembly according to an opening and closing method of the window.

Compared to the casement window assembly, the sliding window assembly has an advantage of being convenient and beautiful in opening and closing, but there is a gap between a window frame and a window when the window is closed, resulting in poor performance in terms of airtightness, watertightness and wind pressure resistance.

Therefore, as a method of compensating for a disadvantage of the above sliding window assembly, a horizontal movement device that improves the airtight performance of the sliding window assembly by moving the window in a horizontal direction perpendicular to a linear movement direction of the window to be in close contact with a window frame in a closed position and eliminating a gap between the window and the window frame has been developed.

For example, as the cited reference of the horizontal movement device, "Horizontal close-fitting window" of Korean Publication No. 10-2012-0050035 is known. The horizontal movement device of the cited reference includes a roller housing that is held on a rail of the window frame, a base plate fixed to the window, and a guide plate and a link member connecting the roller housing and the base plate, and an inclined guide hole is formed in the guide plate at a side of the base plate, and an operation bar of hardware includes a guide pin guided to the inclined guide hole.

Therefore, the base plate is brought close to or separated from the roller housing in a horizontal direction with respect to the roller housing through the guide plate and the link member by guiding the guide pin to the inclined guide hole via linear movement of the operation bar of the hardware, and thus the airtightness of the window assembly is maintained by attaching the window and the window frame when the window is closed, and the window is easily open by being separated from the window frame when the window is open.

A "device for pressing a sliding door on a fixed door frame" of Korean Publication No. 10-2016-0033690 includes a guide member that is held on a rail of a window frame and a fixing member that is fixed to a window, an inclined guide hole is formed at a side of the guide member, a guide pin guided to the inclined guide hole is provided on an operation bar of hardware, the fixing member is close to or separated from the guide member in a horizontal direction by guiding the guide pin to the inclined guide hole via linear movement of the operation bar, the airtightness of the window assembly is maintained by attaching the window and the window frame when the window is closed, and the window is easily open by being separated from the window frame when the window is open.

However, in the cited reference, only a closed state or an open state may be implemented, and when ventilation is performed, the window needs to be inevitably maintained open, and thus there is a problem with security or crime prevention.

DISCLOSURE

Technical Problem

The present disclosure is to resolve the problem, and an objective of the present disclosure is to resolve problems such as intrusion by outsiders by preventing the window from opening even in a ventilated state with the outside in which the window is slightly open.

The present disclosure has another objective of improving opening and closing performance of a window by enabling the window to be open and closed by sliding in a direction most convenient for opening the window among various rotation directions of a handle.

Technical Solution

To achieve the aforementioned objectives, according to an embodiment of the present disclosure, a window assembly having a ventilation function and a horizontal close-fitting function includes a window sash, a window frame in which the window sash is installed to slide, a handle rotatably installed on the window sash, a latch provided on a side surface of the window sash and operatively connected to movement of the handle to move in up and down directions, a latching guide that is provided on the window frame at a relative position facing the latch and by which the latch is or is not latched depending on a position of the latch, and a horizontal movement device provided on at least one of a top surface or a bottom surface of the window sash and operatively connected to the handle to cause horizontal close-fitting or horizontal close-fitting release of the window sash depending on movement of the handle, wherein the latching guide includes a first latching region positioned at an upper part, a second latching region located lower than the first latching region while being spaced apart from the first latching region, and a separation space provided between the first latching region and the second latching region, and a vertical central line of the first latching region and a vertical central line of the second latching region are displaced from each other, and when the latch is located in the first latching region or the second latching region, horizontal close-fitting or horizontal close-fitting release of the window frame is inducted, and when the latch is located in the separation space, the window sash is slidably moveable with respect to the window frame.

The first latching region may include a first side wall part that is open downward and forward, and a first edge part that extends from an edge of the first side wall part and by which the latch is latched, and the second latching region may include a second side wall part that is open upward and forward, and a second edge part that extends from an edge of the second side wall part and by which the latch is latched.

An open part of a lower part of the first latching region may extend to one side and guides the latch out of the first latching region to move toward the second latching region.

A direction in which the first latching region is biased may correspond to a direction in which the window sash is close-fit to the window frame, and when the latch is positioned in and latched by a first latching groove in the first latching region, the window sash may be close-fit to the window frame and may become in a closed state, and the handle may be positioned downward, and a direction in which the second latching region is biased may correspond to a direction in which the window sash is separated from the window frame, and when the latch is positioned in a second latching groove in the second latching region, a close-fitting state of the window sash may be released from the window frame, a fine gap may be formed between a side surface of the window sash and a side surface of the window frame, the latch may be latched in the second latching region to prevent opening, and the handle may be positioned upward When the latch is positioned in the separation space between the first latching region and the second latching region, the handle may be disposed in parallel to a ground, the latch may not be interfered with the first latching region or the second latching region, and a window may be slidably moveable along the window frame.

The horizontal movement device may include a fixing plate, a moving plate disposed to be relatively movable to the fixing plate in a horizontal direction in which a window is close-fit to or separated from the window frame, and including a moving part installed moveably along a rail of the window frame, a linear moving member connected to the fixing plate and linearly moving by a predetermined distance by movement of an operation bar connected to the handle of the window, and a pair of operation links horizontally moving the moving plate with respect to the fixing plate according to linear movement of the linear moving member, wherein, in the linear moving member, an operation hole into which an operation pin of the operation bar is inserted and that moves the linear moving member immediately when the handle is rotated, and a guide hole into which a connection pin connecting the operation links is inserted and that guides movement of the connection pin by movement of the linear moving member are formed, and as the latch and the latching guide are latched, when a close-fitting state of the window is released with respect to the window frame by the horizontal movement device, ventilation is possible through a gap between the window and the window frame, the window restrictedly moves to form the gap, and free opening of the window is prevented.

The operation link may include a first link having an end connected to the fixing plate and a remaining end connected to the linear moving member, and disposed inclined at a predetermined operation angle with respect to a linear movement direction of the linear moving member, the operation angle being changed according to linear movement of the linear moving member, and a second link disposed symmetrically with the first link and having an end connected to the moving plate and a remaining end connected to the linear moving member, the operation angle being changed according to the movement of the linear moving member.

The guide hole may include a linear movement path in parallel to a movement direction of the linear moving member, and an extended movement path extending from the linear movement path and extending in a different direction from the linear movement path.

The linear movement path may include a first linear movement path that communicates with the extended movement path and on which a connection pin connecting the first link and the second link is positioned in a state in which the latch is latched in a lower groove of the latching guide, and a second linear movement path that communicates with the first linear movement path and on which the connection pin connecting the first link and the second link is positioned in a state in which latching between the latch and the latching guide is released.

The window assembly may further include a moving part provided on the moving plate and including a plurality of wheels, and a height adjuster provided on the moving plate to adjust a height of the moving part, wherein the height adjuster may include an inner housing surrounding the moving part and including an inclined guide hole into which a fixed shaft disposed through the moving part is inserted, an outer housing that surrounds the inner housing, into which the fixed shaft is inserted, and that includes a vertical guide hole formed in up and down directions, and a height adjustment screw that connects the inner housing and the outer housing by a screw, adjusts a distance between the inner housing and the outer housing, and adjusts the height of the moving part by adjusting a vertical height of the fixed shaft inserted into the inclined guide hole and the vertical guide hole.

The present disclosure provides a latching guide for a window assembly including a fixing plate, a first latching region positioned above a front surface of the fixing plate, and a second latching region separated from the first latching region and positioned below the first latching region, and a separation space provided between the first latching region and the second latching region, and a vertical central line of the first latching region and a vertical central line of the second latching region may be displaced from each other.

The first latching region may include a first side wall part that is open downward and forward, and a first edge part that extends from an edge of the first side wall part and by which the latch is latched, and the second latching region may include a second side wall part that is open upward and forward, and a second edge part that extends from an edge of the second side wall part and by which the latch is latched.

An open part of a lower part of the first latching region extends to one side may extend to one side to form an extension.

Advantageous Effects

According to the present disclosure, a ventilated mode is added in addition to a closed mode and an open mode in the existing window assembly, and thus ventilation is possible while a window is not open, thereby enhancing security.

Specifically, a latch mounted on a window sash is latched in each latching groove in a first latching region at an upper part provided in the latching guide or a second latching region at a lower part spaced apart therefrom, and when the latch is latched in the first latching region, and in this case, the window is close-fit to the window frame to achieve perfect lock and a closed mode is implemented.

When the latch is latched in the second latching region at the bottom, horizontal close-fitting is released, but since the latch is still latched in the second latching region, a ventilation mode is activated as indoor and outdoor air moves through a gap between the window frame and the window without opening the door.

A separation space is formed between the first latching region and the second latching region of the latching guide, and since there is no latch in the separation space, a user is capable of easily sliding and moving the window to open the window.

The handle is lowered in a horizontal close-fitting mode, the handle is placed horizontally in an open mode, and in a ventilation mode, the handle is raised upward, thereby improving convenience.

In particular, conversion from the closed mode to the open mode or vice versa, or from the ventilation mode to the open mode or vice versa may be easily performed by simply rotating the handle by 90 degrees, thereby improving user convenience.

A linear movement path provided to a linear moving member is formed long, and the linear movement path is divided into a first linear movement path and a second linear movement path. In the ventilated mode, a coupling pin connecting the links are located on a first linear movement path, and in the open mode, the coupling pin is located on the second linear movement path, and thus the ventilated mode may be practically smoothly implemented.

BEST MODE

Figure 1:
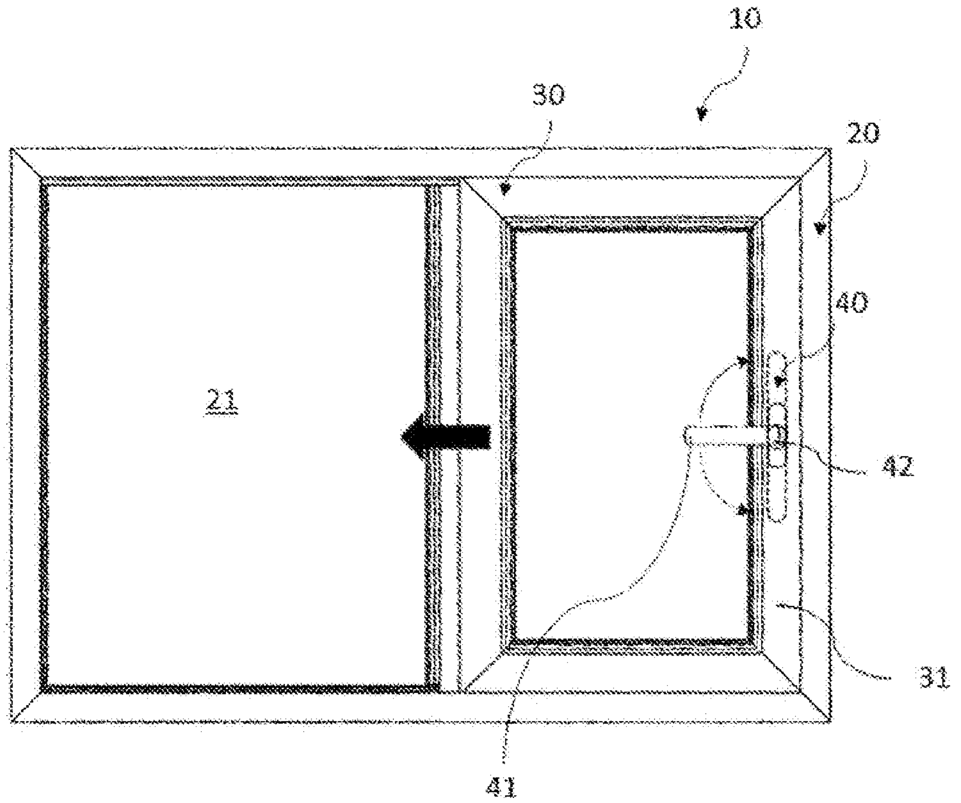
FIG. 1 is a front view of a window assembly according to the present disclosure.

As the disclosure allows for various changes and numerous embodiments, particular embodiments will be illustrated in the drawings and described in detail in the written description.

However, this is not intended to limit the present disclosure to particular modes of practice, and it is to be appreciated that all changes, equivalents, and substitutes that do not depart from the spirit and technical scope of the present disclosure are encompassed in the present disclosure.

The terms such as "first" and "second" are used herein merely to describe a variety of constituent elements, but the constituent elements are not limited by the terms.

The terms are used only for the purpose of distinguishing one constituent element from another constituent element.

For example, a first element may be termed a second element and a second element may be termed a first element without departing from the teachings of the present disclosure.

The term and/or includes a combination of a plurality of related recited items or any one of a plurality of related recited items.

It will be understood that when an element, such as a layer, a region, or a substrate, is referred to as being "on", "connected to" or "coupled to" another element, it may be directly on, connected or coupled to the other element or intervening elements may be present.

In contrast, when an element is referred to as being "directly on," "directly connected to" or "directly coupled to" another element or layer, there are no intervening elements or layers present.

The terms used in the present specification are used for explaining a specific exemplary embodiment, not limiting the present disclosure.

The singular expressions in the present specification include the plural expressions unless clearly specified otherwise in context.

The terms such as "include" or "comprise" may be construed to denote a certain characteristic, number, step, operation, constituent element, or a combination thereof, but may not be construed to exclude the existence of or a possibility of addition of one or more other characteristics, numbers, steps, operations, constituent elements, or combinations thereof.

Hereinafter, the embodiment will be described in detail with reference to the accompanying drawings, but the same or corresponding components regardless of reference numerals are given the same reference numerals, and overlapping descriptions thereof will be omitted.

A window assembly having a horizontal close-fitting function 10 according to the present disclosure may include a window frame 20 having an opening 21 on which a rail is formed to allow the window to move, and a window 30 accommodated in the window frame 20 to slide.

A window sash 31 is provided on an edge of the window 30, and a rotatable handle 40 is provided on one side of the window sash 31. The handle 40 may rotate up and down by 180 degrees. A state of the window depending on a position of the handle 40 is as follows.

Figure 2:
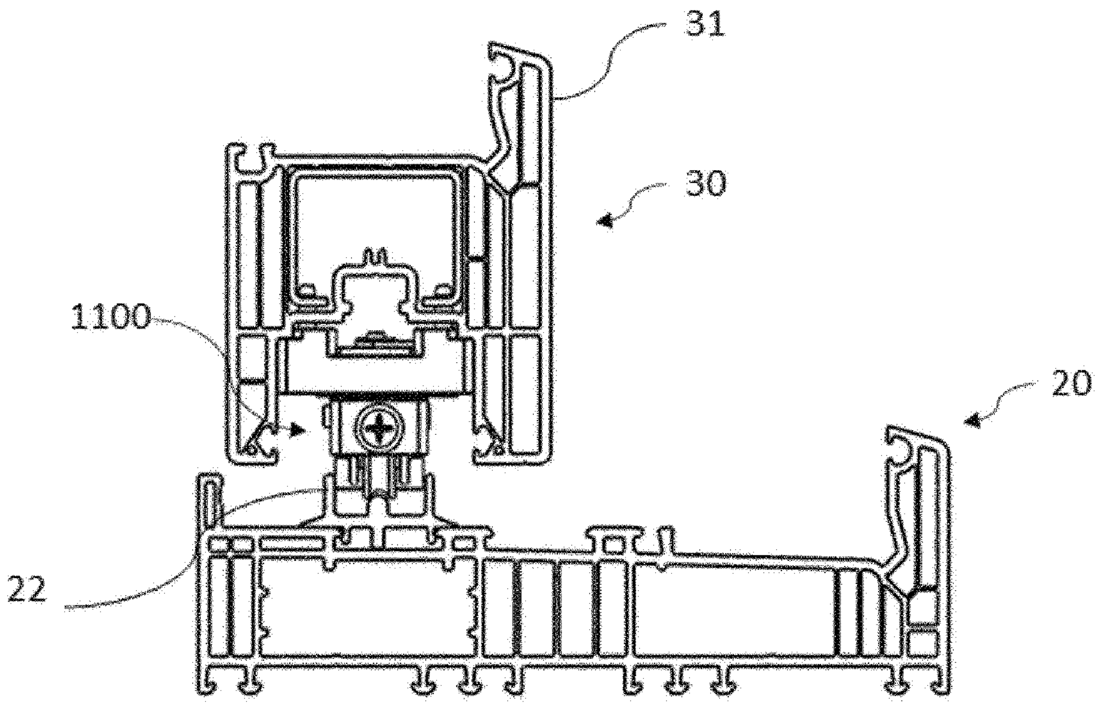
FIG. 2 is a side cross-sectional view showing a state in which horizontal close-fitting is released in a window assembly according to the present disclosure.

When an end 41 of the handle 40 (opposite to the rotation part 42) faces upward, the window 30 becomes a ventilated state. There is no horizontal close-fitting between the window sash 31 and the window frame 20, and the window sash 31 may not interfere with any portion of the window frame 20. An arrangement relationship between the window 30 and the window frame 20 is shown in FIG. 2.

In this case, a latch 300 (refer to FIG. 4) of the window 30 to be described below is latched by a second latching region 204 (refer to FIG. 5) of a latching guide 200 of the window frame 20, and thus the window 30 may not slide and may not be open.

Nevertheless, a narrow gap may be generated between the window sash 31 and the window frame 20, and a ventilation function may be performed by moving the inside and outside air through the gap.

When the window sash 31 is attempted to move in an opening direction, the window sash 31 attempts to move while rattling, but as a result, the window 30 may not be open due to a latching relationship between the latch 300 and the second latching region 204 of the latching guide 200 described above.

Therefore, a distance at which the window 30 moves in this state is about a distance until the latch 30 moves slightly from the inside of the latching guide but eventually becomes latched and does not no longer move (e.g., 0.5 to 1 cm).

When the handle 40 is disposed in parallel to the ground, the window 30 becomes an openable state. There is no horizontal close-fitting between the window sash 31 and the window frame 20, and the window sash 31 may not interfere with any portion of the window frame 20. The arrangement relationship between the window 30 and the window frame 20 is also shown in FIG. 2.

Accordingly, when a user moves the window 30 in a direction indicated by a thick arrow, the window sash 31 moves along the rail and becomes an open state. That is, as shown in FIG. 2, the window sash 31 is disposed at a left side in FIG. 2 or is disposed outside the window frame 20, and is spaced apart from a middle region of the window frame 20.

The user may move the window 30 in an opening direction (indicated by a thick arrow) by holding the horizontally arranged handle 40 and moving the handle 40 in the opening direction, and in contrast, the user may move the window 30 in a closing direction (an opposite direction to the direction indicated by the thick arrow) by holding the holding the horizontally arranged handle 40 and moving the handle 40 in the closing direction.

Here, reference numeral 1100 denotes a horizontal movement device to be described later, and reference numeral 22 denotes a rail on which wheels provided in the horizontal movement device are accommodated.

When the end 41 of the handle 40 (opposite to the rotation part 42) faces downward, the window 30 is in a closed state. The window sash 31 and the window frame 20 are in a horizontal close-fitting state, and the latch 300 of the window 30 is latched in a first latching region 203 of the latching guide 200 in the window frame 20.

Figure 3:
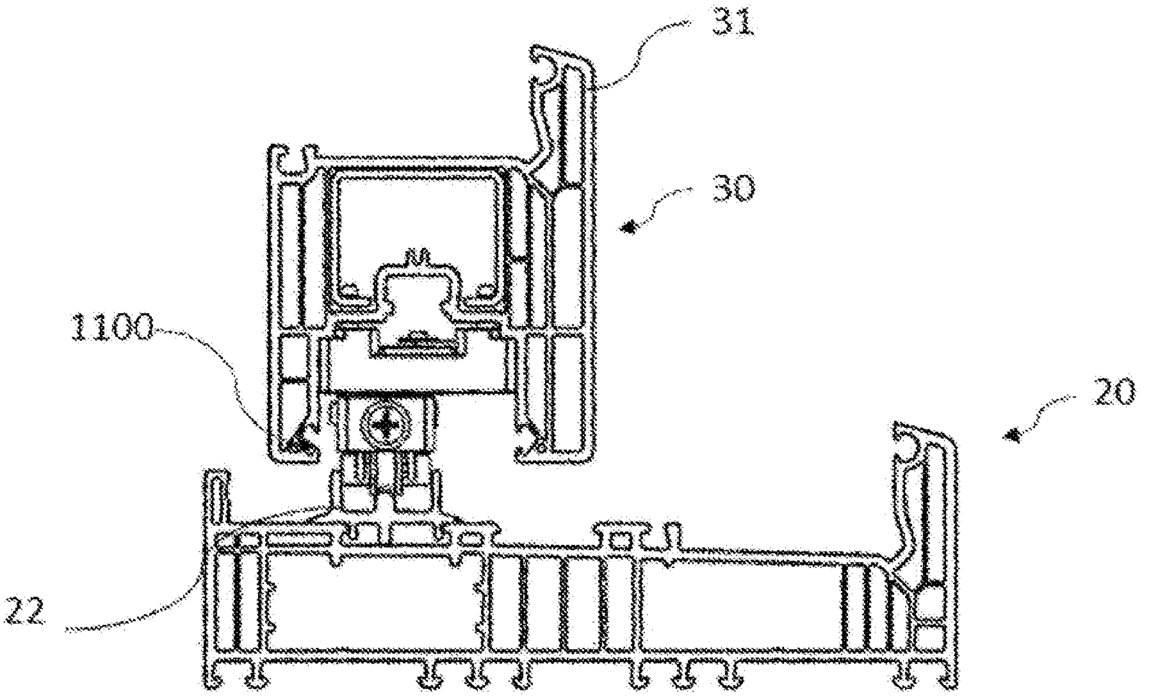
FIG. 3 is a side cross-sectional view showing a horizontal close-fitting state in a window assembly according to the present disclosure.

That is, as shown in FIG. 3, the window 30 relatively moves to one side (to the right in FIG. 3) compared to the state of FIG. 2 and is closely fit to a wall (not shown) or a rib (not shown) at the center of the window frame 20.

Figure 4:
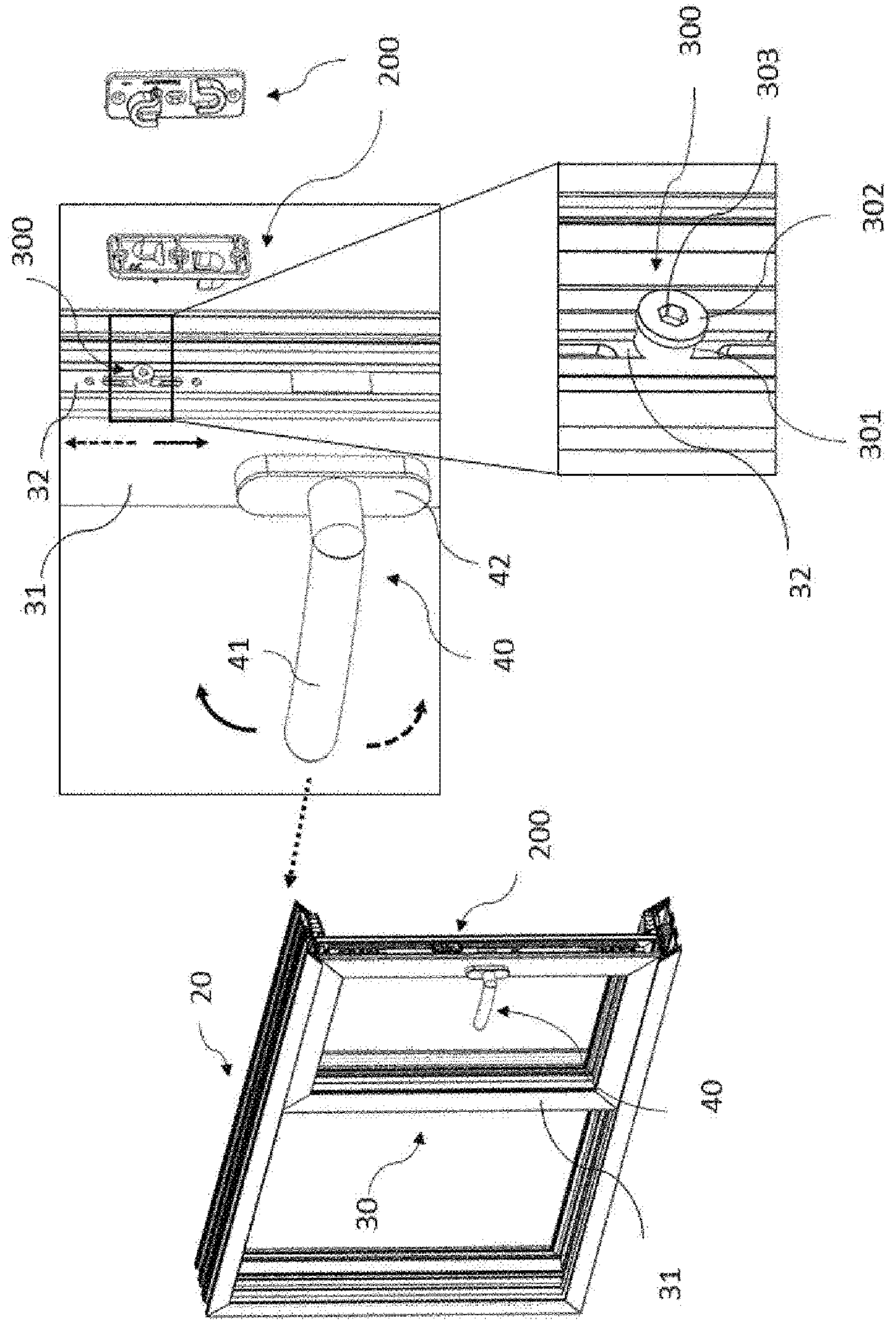
FIG. 4 is a perspective view of a latch and a latching guide of a window assembly according to the present disclosure.

As shown in FIG. 4, the handle 40 is operatively connected to a vertical operation bar 32 through a known predetermined connection structure. The vertical operation bar 32 refers to a long strip-shaped bar provided on a side surface of the window sash 31 and moveable upward or downward according to pivoting of the handle 40.

The latch 300 is provided to protrude from the vertical operation bar 32, and the latch 300 includes a body 301 and a flange 302 that is formed to be stepped and has a larger outer diameter than the body 301. Reference numeral 303 is a wrench hole.

To implement the closing function of the window 30, when the handle 40 pivots downward (dotted arrow), the vertical operation bar 32 and the latch 300 connected thereto move up.

To implement the ventilation function of the window 30, when the handle 40 pivots upward (solid arrow), the vertical operation bar 32 and the latch 300 connected thereto move down.

When the handle 40 is placed in a horizontal direction to allow the window 30 to slide and open or close, the vertical operation bar 32 and the latch 300 connected thereto may be positioned between a position of the vertical operation bar 32 and the latch 300 connected thereto during the ventilation function and a position of the vertical operation bar 32 and the latch 300 connected thereto during the closing function.

Figure 5:
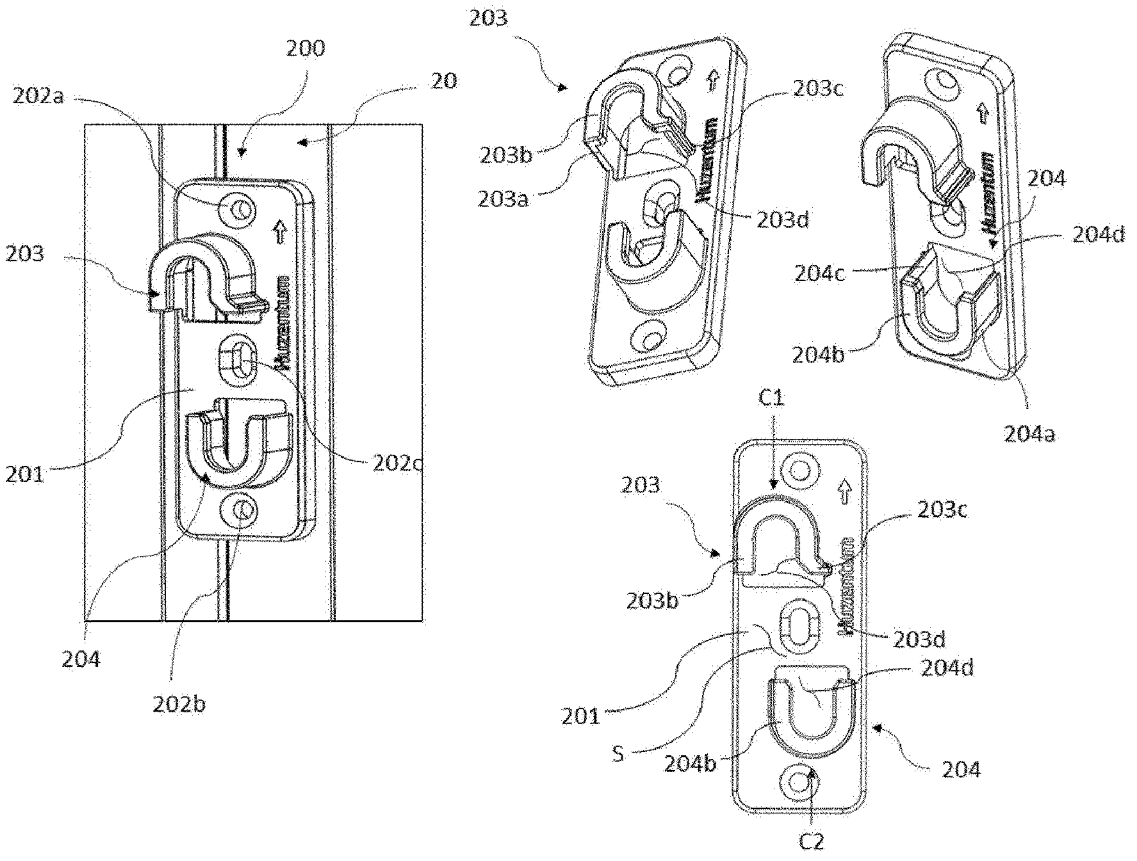
FIG. 5 is a perspective view and a front view of a latching guide of a window assembly according to the present disclosure.

The latching guide 200 is provided at an opposite side of the latch 300. As shown in FIG. 5, the latching guide 200 is fixed to an inner surface of the window frame 20. The latching guide 200 includes a fixing plate 201 having insertion holes 202*a*, 202*b*, and 202*c* into which screws are inserted, a first latching region 203 with a "∩" shape located in an upper front region of the fixing plate 201, and the second latching region 204 with a "∪" shape disposed below the first latching region 203 and spaced apart from the first latching region 203.

A separation space S is formed between the first latching region 203 and the second latching region 204.

The first latching region 203 guides the window 30 to horizontally close-fit to the window frame 20.

The first latching region 203 includes a first side wall part 203*a* that is open downward and forward, and a first edge part 203*b* that extends inwardly from an edge of the first side wall part 203*a* and by which the latch 300 is latched.

Therefore, a stepped structure is formed by the first edge part 203*b*, and the flange 302 of the latch 300 is latched on the stepped part and may not come out forward, and in this state, the window 30 is prevented from sliding.

A first latching groove 203*d* holding the latch 300 is formed by the first edge part 203*b* and the first side wall part 203*a*, and an opening of the first latching groove 203*d* is open downward.

An extension 203*c* is provided with a side wall and an edge portion adjacent to an opening portion of a lower portion of the first latching region 203 extending obliquely to one side. The extension 203*c* guides the latch 300 out of the first latching region 203 to move toward the second latching region 204.

The second latching region 204 supports the window 30 to move horizontally with respect to the window frame 20 and maintain a close-fitting release state. In this state, the above-described ventilation mode is possible.

The second latching region 204 includes a second side wall part 204*a* that is open upward and forward, and a second edge part 204*b* that extends inwardly from the edge of the second side wall part 204*a* and by which the latch 300 is latched.

Therefore, a stepped structure is formed by the second edge part 204*b*, and the flange 302 of the latch 300 is latched on the stepped part and may not come out forward, and in this state, the window 30 is prevented from sliding.

A second latching groove 204*d* for holding the latch 300 is formed by the second edge part 204*b* and the second side wall part 204*a*, and the opening of the second latching groove 204*d* is open upward.

In addition, an inclined part 204*c* or a chamfer is provided on both sides of the inside of the opening part of the upper part of the second latching region 204. This is to guide easy entry into the second latching groove 204*d* after the latch 300 descends.

Backs of the first latching groove 203*d* and the second latching groove 204*d* may be all perforated to reduce the weight and amount of a material of the latching guide 200.

The separation space S is provided between the first latching region 203 and the second latching region 204, and in a state in which the latch 300 moves out of the first latching region 203 and descends or the latch 300 moves out of the second latching region 204 and ascends to be positioned in the separation space S, when a user applies an external force to slide the window 30 (e.g., when the handle is pulled while being held in an opening direction), the window 30 moves smoothly and is open because the latch 300 is not latched on the latching guide 200.

A vertical central line C1 of the first latching region 203 and a vertical central line C2 of the second latching region 204 are displaced from each other, and thus when the latch 300 is located in the first latching region 203 or the second latching region 204, horizontal close-fitting or horizontal close-fitting release of the window frame may be induced. When the latch 300 is located in the separation space S, sliding movement of the window sash relative to the window frame is possible.

Figure 6:
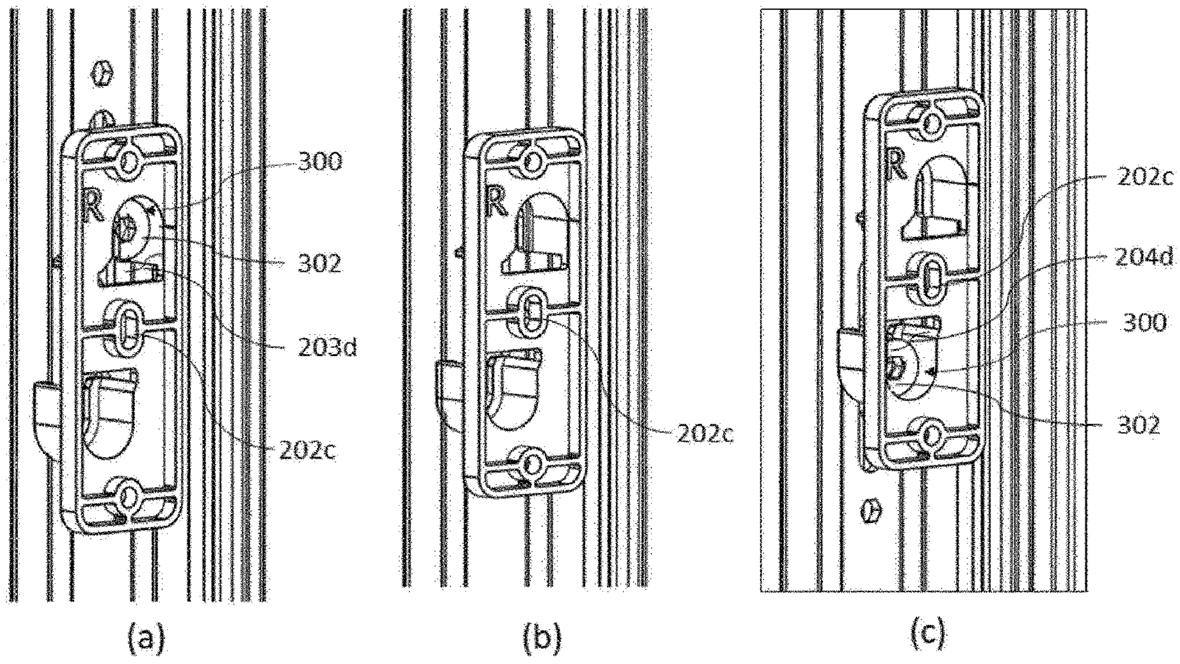
FIG. 6 is a perspective view showing a relative operating process between a latch and a latching guide in a window assembly according to the present disclosure.
Figure 7:
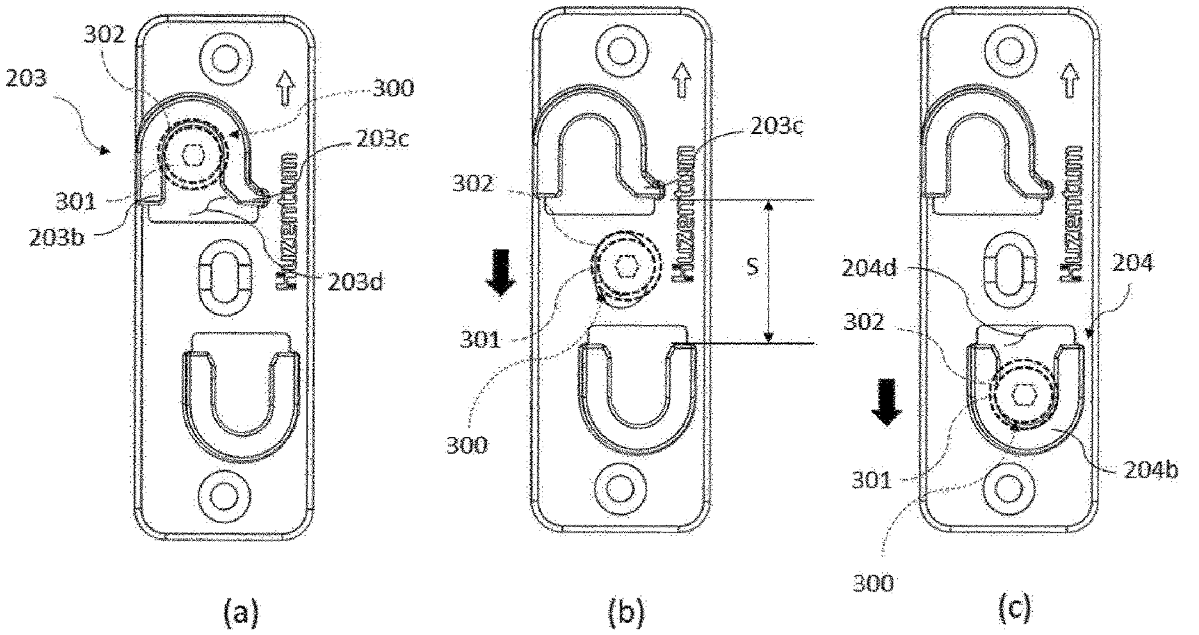
FIG. 7 is a front view showing a relative operating process between a latch and a latching guide in a window assembly according to the present disclosure.

As shown in FIGS. 6(*a*) and 7(*a*), when the latch 300 is located in the first latching groove 203*d*, the window 30 is in a horizontal close-fitting state with the window frame 20, and the flange 302 of the latch 300 is latched on the first edge part 203*b* (refer to FIG. 5), and thus the window 30 may never be open, and there is no horizontal gap between the window 30 and the window frame 20.

In this state, inflow of outside air is completely blocked.

In this state, when the handle 40 is gradually raised upward and rotated such that the handle 40 is in a horizontal state, the horizontal close-fitting state of the window 30 is released, and as shown in FIGS. 6(*b*) and 7(*b*), the latch 300 is located in the separation space S. In FIG. 6(*b*), the latch 300 is not visible because the latch 300 is covered, but a position thereof is approximately in front of an installation hole 202*c*.

When the handle 40 is rotated by 90 degrees in the horizontal close-fitting state shown in FIGS. 6(*a*) and 7(*a*) and converted to a horizontal state, the horizontal close-fitting is released and becomes an openable state as shown in FIGS. 6(*b*) and 7(*b*), and in the process, the latch 300 moves toward the extension 203*c* while descending, and descends vertically in the state.

Then, the latch 300 is located in the separation space S.

When the latch 300 is located in the separation space S, there is no place in which the latch 300 is latched, and thus the window may be easily open while sliding.

When the handle 40 faces upward by rotating 90 degrees in the state, the latch 300 is located in the second latching region 204 as shown in FIGS. 6(*c*) and 7(*c*).

Since the latch 300 descends and enters the second latching groove 204*d*, and the flange 302 is latched on the second edge part 204*b*, deviation in a forward direction (window opening direction) is prevented.

However, since the horizontal close-fitting state is released and the window frame 20 and the window 30 are horizontally spaced apart, a slight gap is generated, and also, when the window 30 is attempted to move, the window may slightly shake while rattling.

Since a gap is generated between a side surface of the window 30 and an inner surface of the window frame 20, ventilation is possible through these gaps.

The horizontal movement device 1100 that causes horizontal close-fitting or horizontal close-fitting release of the window 30 will be described.

Figure 8:
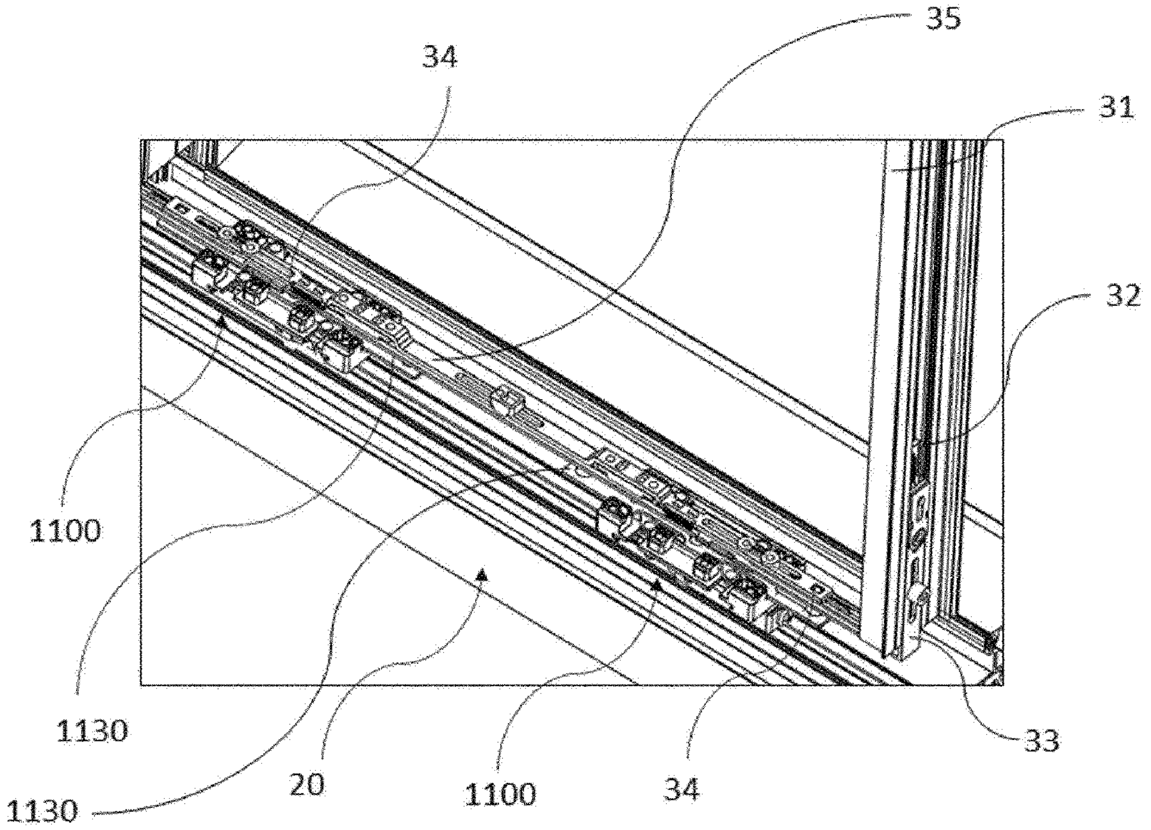
FIG. 8 is a diagram showing a state in which a horizontal movement device is installed in a window assembly according to the present disclosure.

FIG. 8 shows the structure of components inside the window sash 31 with a lower region removed. A horizontal operation bar 34 connected to the vertical operation bar 31 is disposed below the window sash 31 in a longitudinal direction of the window sash 31.

A first connection operation bar 33 bent in an 'L' shape is provided at a corner edge of the window sash 31 to connect a vertical operation bar 34 and a vertical operation bar 32.

The horizontal movement device 1100 is provided to be spaced apart in plurality, the horizontal operation bars 34 are connected to the horizontal movement devices 1100, respectively, and the horizontal operation bars 34 may be connected by the horizontally arranged second connection operation bar 35 and may move together.

The horizontal operation bar 34 is connected to the horizontal movement device 1100, and is particularly connected to a linear moving member 1130 of the horizontal movement device 1100.

Therefore, when the handle 40 is rotated, the vertical operation bar 32 and the latch 300 move up and down, and accordingly, the horizontal operation bar 34 moves horizontally, and the linear moving member 1130 connected thereto also moves horizontally.

Figure 9:
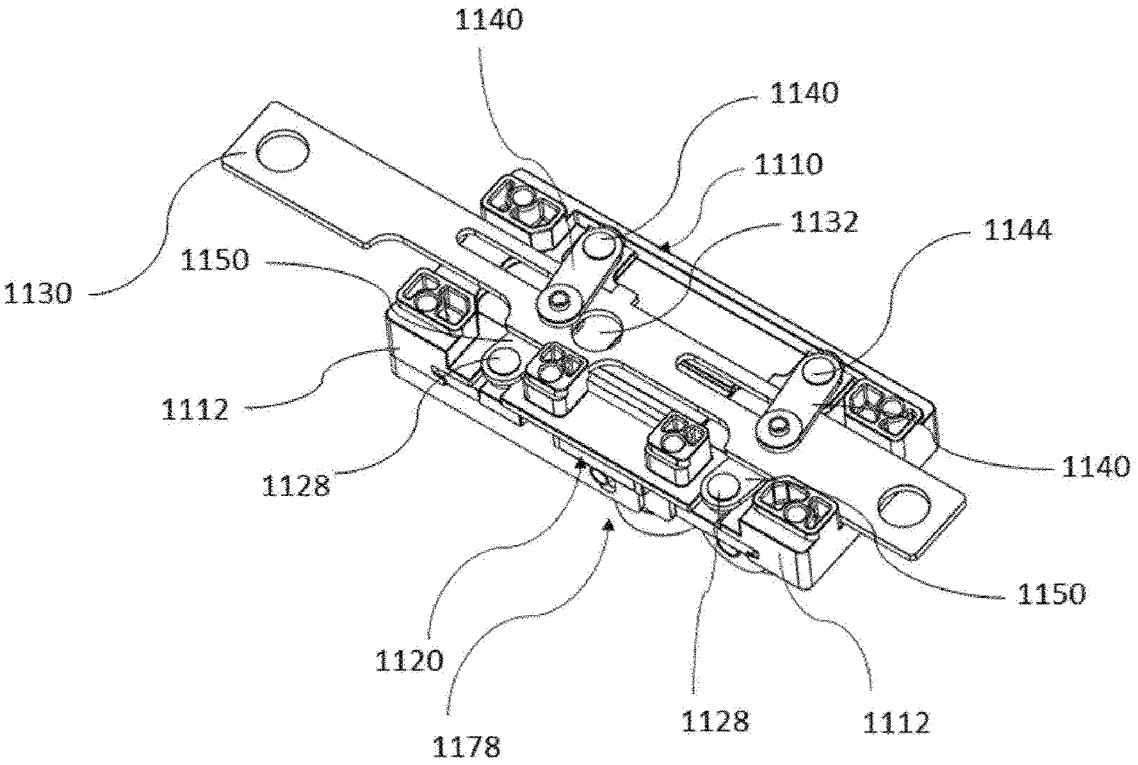
FIG. 9 is a top perspective view of a horizontal movement device of a window assembly according to the present disclosure.
Figure 10:
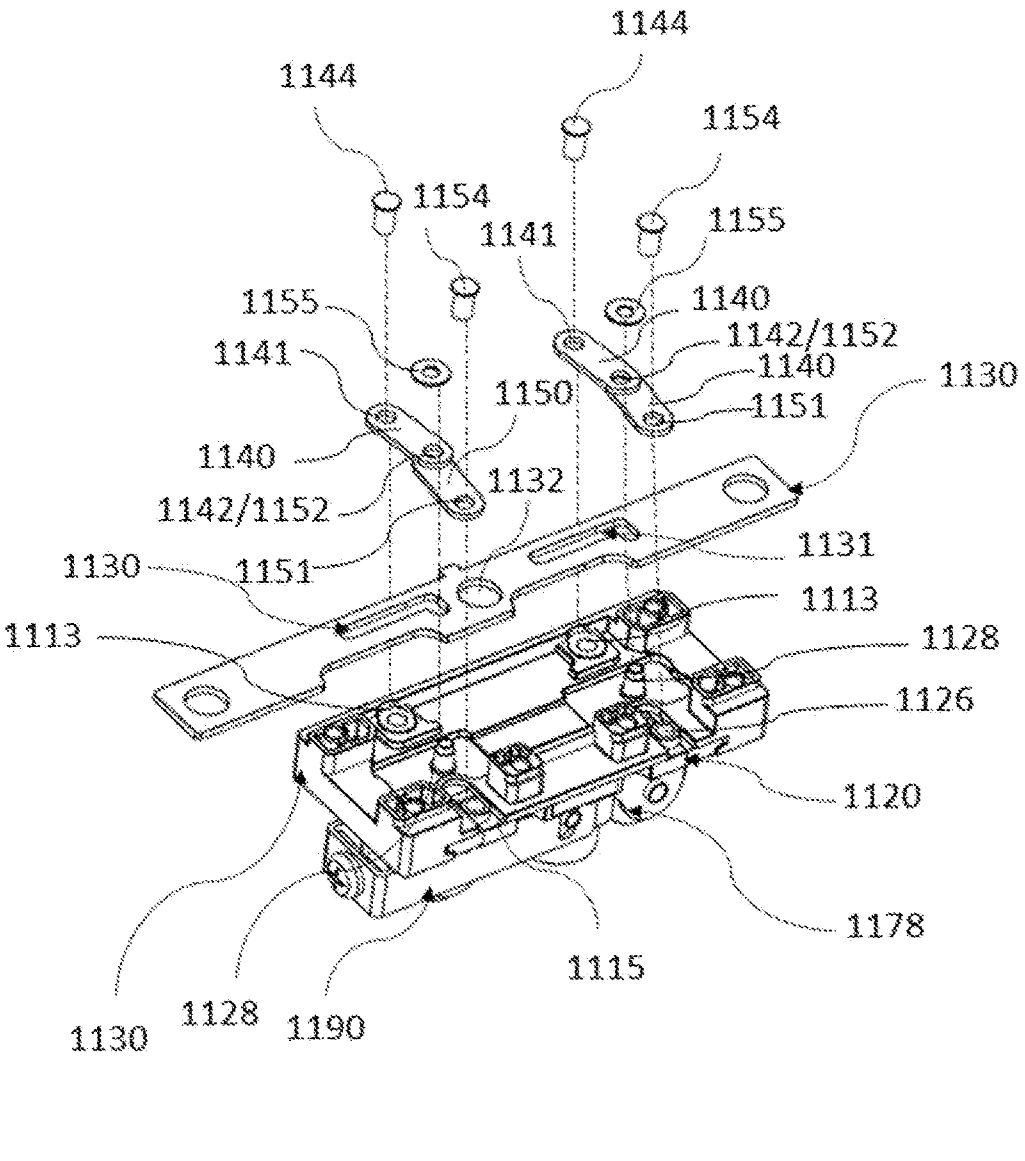
FIG. 10 is a partial exploded perspective view of a horizontal movement device of a window assembly according to the present disclosure.
Figure 11:
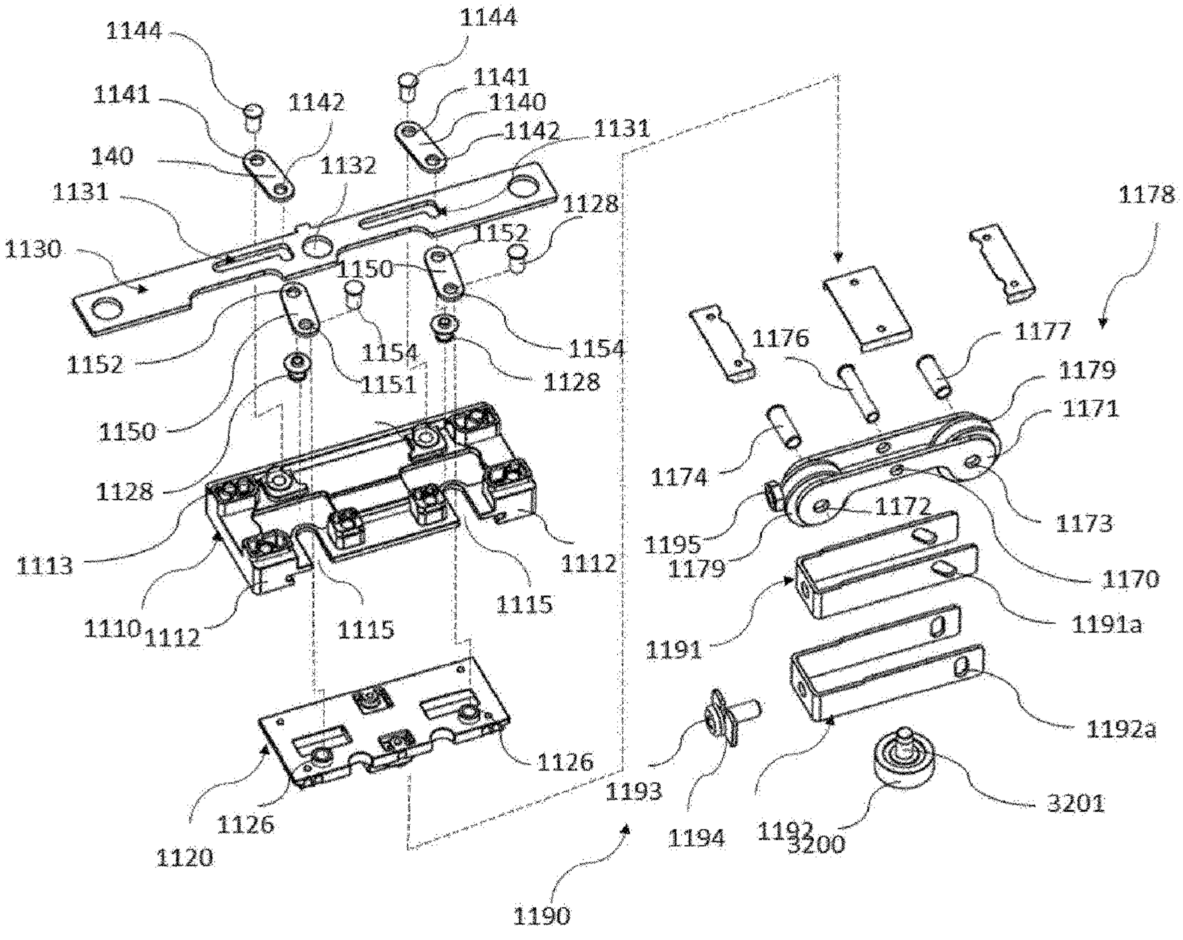
FIG. 11 is an entire exploded perspective view of a horizontal movement device of a window assembly viewed from the above according to the present disclosure.

As shown in FIGS. 9 to 11, the horizontal movement device 1100 includes a fixing plate 1110 connected to the window 30 and a moving plate 1120 including a moving part 1178 on which the window 30 is moveable relative to the fixing plate 1110 in a horizontal direction of being close-fit to or spaced apart from the window frame 20 and is installed to be moveable along a rail (not shown) of the window frame.

The horizontal movement device 1100 may include the linear moving member 1130 that is connected to the fixing plate 1110 and linearly moves by a predetermined distance via movement of an operation bar (not shown) of the window 30, and operation links 1140 and 1150 that horizontally move the moving plate 1120 with respect to the fixing plate 1110 according to linear movement of the linear moving member 1130.

The fixing plate 1110 is fixedly installed to the window 30, and the moving plate 1120 is movably disposed on the fixing plate 1110.

The moving plate 1120 is disposed on the fixing plate 1110 such that the window 30 is moveable in a horizontal direction of being close-fit to or separated from the window frame 20. In addition, the moving plate 1120 may include the moving part 1178 installed to be movable along a rail (not shown) of the window frame.

Therefore, the window 30 may be close-fit and fixed to the window frame 40 not to be moved by lowering and operating the handle 40 (refer to FIG. 1) such that an end of the handle 40 faces downward, which may be performed via relative horizontal movement between the moving plate 1120 and the fixing plate 1110.

In this case, since the moving plate 1120 is connected to a rail (not shown) of the window frame 20 by the moving part 1178 described above, the fixing plate 1110 relatively moves in a direction of being close-fit to the window frame 20.

Eventually, the window 30 to which the fixing plate 1110 is close-fit to the window frame 20.

When the handle 40 is raised to allow an end thereof to face upward or operated in a horizontal state, the fixing plate 1110 relatively moves in a direction away from the window frame 20 to release close fitting between the window frame 20 and the window 30.

The fixing plate 1110 may include a guide part 1112 guiding the moving plate 1120 to be movable.

That is, both ends of the moving plate 120 are constrained in a vertical direction (longitudinal direction) by the guide part 1112, and the moving plate 1120 is accommodated in the guide part 1112 to be movable in a horizontal direction.

Therefore, as will be described later, the moving plate 1120 and the fixing plate 1110 may move relative to each other by movement of the linear moving member 1130.

When the moving plate 1120 described above is disposed on a bottom surface of the fixing plate 1110, the linear moving member 1130 may be connected to a top surface of the fixing plate 1110.

The linear moving member 1130 may be installed to be operatively connected to the horizontal operation bar 34 and move in the same direction as the movement direction of the horizontal operation bar 34.

In this case, the linear moving member 1130 may be installed to be operatively connected to the horizontal operation bar 34 within a window horizontal movement operation period, that is, a period until the window 30 actually starts horizontal movement according to rotation manipulation of the handle 40 and close-fits to the window frame 20.

For the operatively connected structure of the horizontal operation bar 34 and the linear moving member 1130, according to the present embodiment, an operation hole 1132 through which an operation pin (not shown) of the operation bar 34 is inserted and guided may be formed on the linear moving member 1130.

When the operation hole 1132 is formed in a circular shape, the linear moving member 1130 moves immediately when the handle 40 of the window is rotated, or the linear moving member 1130 moves simultaneously with rotation of the handle 40 of the window.

Therefore, even if the window handle is rotated by 90 degrees instead of 180 degrees as in the conventional art, the window may be close-fit to the window frame (when converting from an openable mode to a lock mode) or may separate the window from the window frame (when converting a lock mode to an openable mode).

The fixing plate 1110 and the linear moving member 1130 may be connected through a first link 1140, and the moving plate 1120 and the linear moving member 1130 may be connected through a second link 1150.

For example, one end of the first link 1140 is connected to the fixing plate 1110 and the other end is connected to the linear moving member 1130. In addition, one end of the second link 1150 is connected to the moving plate 1120 and the other end is connected to the linear moving member 1130.

At this time, the first link 1140 and the second link 1150 are disposed in a mutually symmetrical manner based on a linear moving member 1130. Thus, the first link 1140 and the second link 1150 are installed to be inclined ata predetermined operating angle with respect to a linear movement direction of the linear moving member 1130.

Therefore, the operation angle may change according to the linear movement of the linear moving member 1130, and thus the fixing plate 1110 and the moving plate 1120 may move relatively.

At this time, the first link 1140 and the second link 1150 are arranged on both sides of the linear moving member 1130, respectively, with the linear moving member 1130 interposed therebetween, and thus may achieve the same position condition for the linear moving member 1130, and the link 1140 and the second link 1150 may have the same length such that the moving plate 1120 and the fixing plate 1110 relatively move in a horizontal direction (direction perpendicular to a window movement direction).

In this case, a first connection hole 1141 may be formed at one end of the first link 1140, and a first hinge pin 1144 may pass through the first connection hole 1141 and be fixed to a first fixing hole 1113 of the fixing plate 1110.

A second connection hole 1151 may be formed at one end of the second link 1150, and a second hinge pin 1154 may pass through a second fixing hole 1126 of a moving plate 120 and be fixed to the second connection hole 1151.

At this time, the fixing plate 1110 may be provided with a recess 1115 in the form of a long groove through which the second hinge pin 1154 passes.

That is, the second hinge pin 1154 is disposed to simply pass through the recess 1115 and is not fastened or connected to the fixing plate 1110.

In addition, the other ends of the first link 1140 and the second link 1150 are connected by one connection pin 1128 installed through the linear moving member 1130. That is, the connection pin 1128 connects a third connection hole 1142 formed at the other end of the first link 1140 and a fourth connection hole 1152 formed at the other end of the second link 1150.

Therefore, force applied by movement of the linear moving member 1130 may be transmitted to the fixing plate 1110 and the moving plate 1120 connected to the ends of the first link 1140 and the second link 1150 as a maximum uniform force.

The connection pin 1128 connecting the first link 1140 and the second link 1150 may be inserted into the linear moving member 1130, and a guide hole 1310 guiding movement of the connection pin 1128 may be formed by movement of the linear moving member 1130.

A guide hole 1131 may guide the connection pin 1128 connecting the first link 1140 and the second link 1150 to each other when the linear moving member 1130 moves.

A fixing washer 1155 may be provided on an upper part of the connection pin 1128 to prevent separation between the connection pin 1128 and the guide hole 1310.

Figure 12:
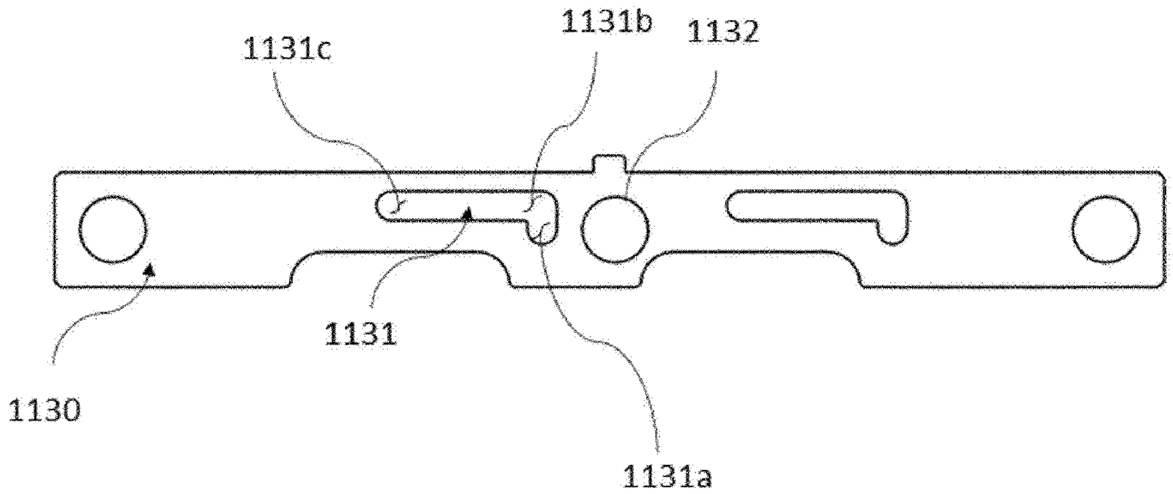
FIG. 12 is a plan view of a linear movement member of a window assembly according to the present disclosure.

As shown in FIG. 12, the guide hole 1131 may include linear movement paths 1131*b* and 1131*c* parallel to a movement direction of the linear moving member 1130, and an extended movement path 1131*a* extending in a direction different from the linear movement paths 1131*b* and 1131*c*.

A direction in which the extended movement path 1131*a* is formed may be orthogonal or perpendicular to the linear movement paths 1131*b* and 1131*c*, but is not limited thereto.

As will be described later, when the connection pin 1128 is placed on the extended movement path 1131*a*, the window is in a closed mode, when the connection pin 1128 is placed on a first linear movement path 1131*b*, the window is in an open mode, and when the connection pin 1128 is placed on a second linear movement path 1131*c*, the window is in an openable mode.

The moving part 1178 provided on the moving plate 1120 may include a guide roller 3200 and a wheel 1179 movably installed along a rail (not shown) of the window frame 20.

Even when the size of the window and the size of the window frame are standardized and provided, an error may occur due to a drawing tolerance. In this case, the moving part 1178 provided in the window may not accurately contact the rail of the window frame 20, which acts as a factor hindering movement of the window.

Accordingly, the moving part 1178 of the window assembly according to the present disclosure may include a height adjuster 1190 provided on the moving plate 1120 to adjust the height of the moving part 1178.

The moving part 1178 may accurately contact the rail of the window frame by adjusting the height of the moving part 1178 including the wheel 1179 by the height adjuster 1190.

Figure 13:
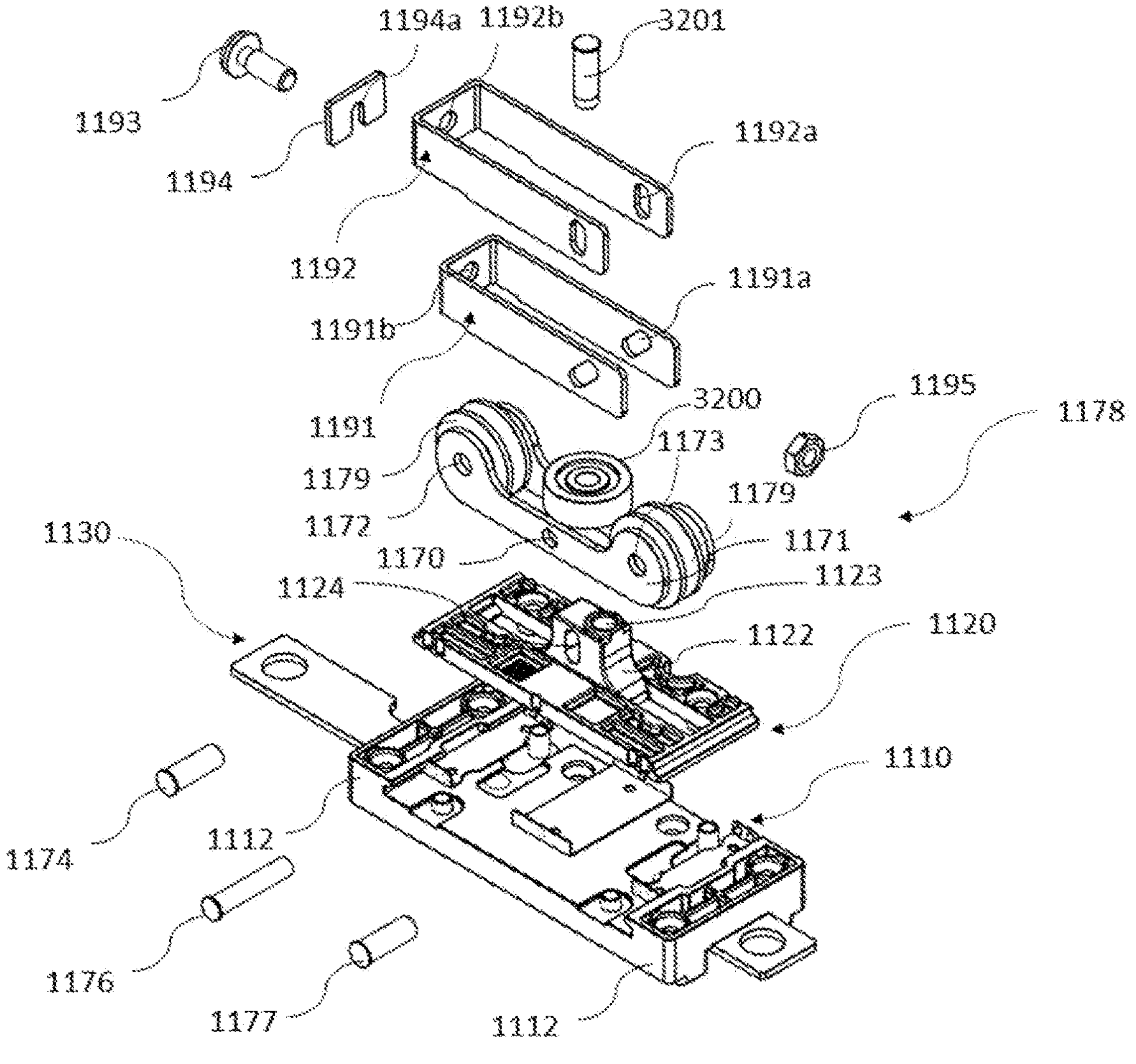
FIG. 13 is an entire exploded perspective view of a horizontal movement device of a window assembly upside down according to the present disclosure.
Figure 14:
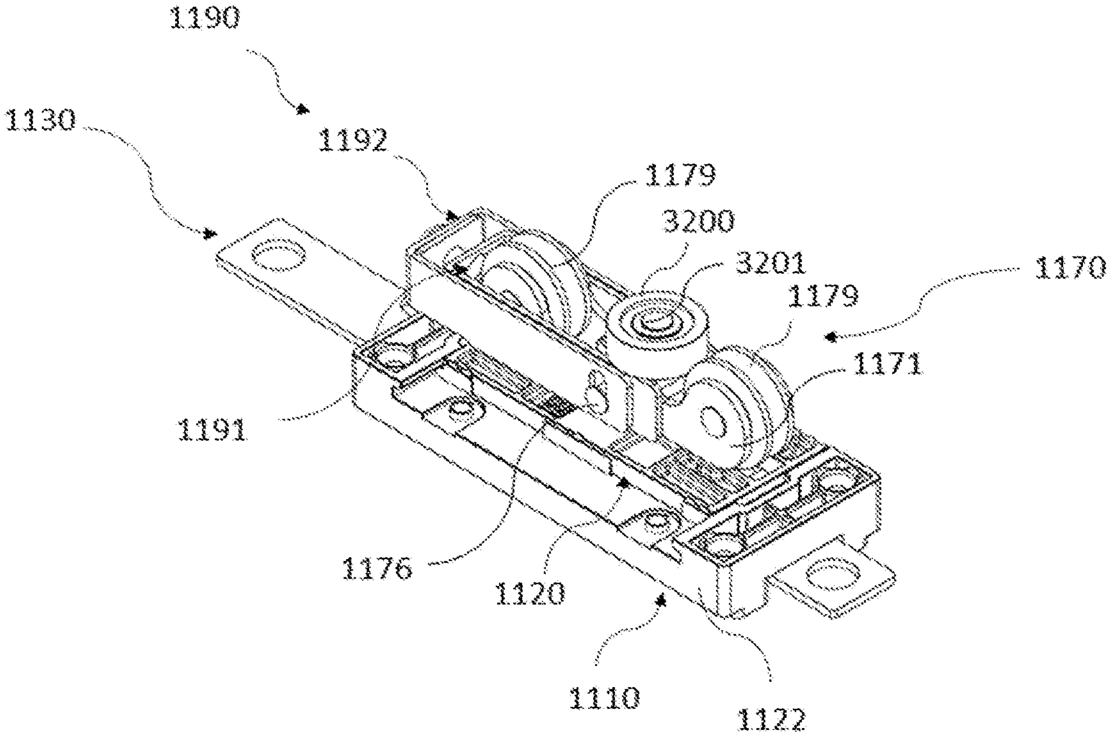
FIGS. 14 and 15 are perspective views of a horizontal movement device of a window assembly upside down according to the present disclosure.

As shown in FIGS. 13 and 14, when the moving part 1178 includes the wheel 1179, the wheel 1179 may be provided in a pair, and a wheel support plate 1171 may be provided on both sides.

When the wheels 1179 are arranged in a row, the wheel support plate 1171 may rotatably fix the wheel 1179 from both sides.

In this case, through holes 1172 and 1173 through which rotation shafts 1174 and 1177 of the wheel 1179 penetrate and are connected may be formed in the wheel support plate 1171. When a pair of the wheel 1179 is provided, a pair of the rotation shafts 1174 and 177 and the through holes 1172 and 1173 may also be formed.

Furthermore, a support shaft 1176 for fixing the wheel support plate 1171 may be disposed through a central portion of the wheel support plate 1171. The support shaft 1176 may be disposed through a central through hole 1170 of the wheel support plate 1171.

A protrusion 1120 protrudes from the moving plate 1120 toward the moving part 1178, and the support shaft 1176 of the moving part 1178 penetrates. The height adjusting unit 1190 is connected to the protrusion 1120 to adjust the height.

Although the protrusion 1120 is shown integrally formed with the moving plate 1120, a separate coupling structure is also possible.

A vertical guide hole 1124 through which the support shaft 1176 passes may be formed in the protrusion 1120 to guide the support shaft 1176 of the moving part 1178 to move vertically.

The vertical guide hole 1124 is formed in a vertical or up-and-down direction and, as will be described later, may function as a guide when the support shaft 1176 moves up and down.

A support hole 1123 to which a support pin 3201 for supporting a guide roller 3200 is mounted and fixed may be provided at an end of the protrusion 1120.

The height adjuster 1190 includes an inner housing 1191 formed in a shape and surrounding the wheel 1179 and the wheel support plate 1171, and an outer housing 1192 surrounding the inner housing 1191.

The inner housing 1191 and the outer housing 1192 are connected by an adjustment screw 1193 to adjust a distance therebetween, a guide plate 1194 that is inserted into the adjustment screw 1193, guides movement of the adjustment screw 1193, and reinforces strength may be provided outside the outer housing 1192, and a guide groove 1194*a* is formed in a shape with one side open on the guide plate 1194. A thread of the adjustment screw 1193 passes through the guide groove 1194*a*.

An inclined guidance groove 1191*a* is provided on the inner housing 1191, a vertical guidance groove 1192*a* is provided on the outer housing 1192, and the support shaft 1176 is disposed through the inclined guidance groove 1191*a* and the vertical guidance groove 1192*a*.

A screw support 1195 in the form of a nut on which the adjustment screw 1193 is rotatably installed may be provided inside a short side of the inner housing 1191, and an external through hole 1192*b* and an internal through hole 1191*b* through which the adjustment screw 1193 penetrates may be provided on the short side of the outer housing 1192 and the short side of the inner housing 1191, respectively.

Thread taps may be formed on both the external through hole 1192*b* and the internal through hole 1191*b*.

Therefore, when a user turns the adjustment screw 1193, a distance between the outer housing 1192 and the inner housing 1191 changes, the inclined guidance groove 1191*a* and the vertical guidance groove 1192*a* perform relative movement, and the support shaft 1176 sandwiched therebetween may move up or down along the inclined guidance groove 1191*a*.

Figure 15:
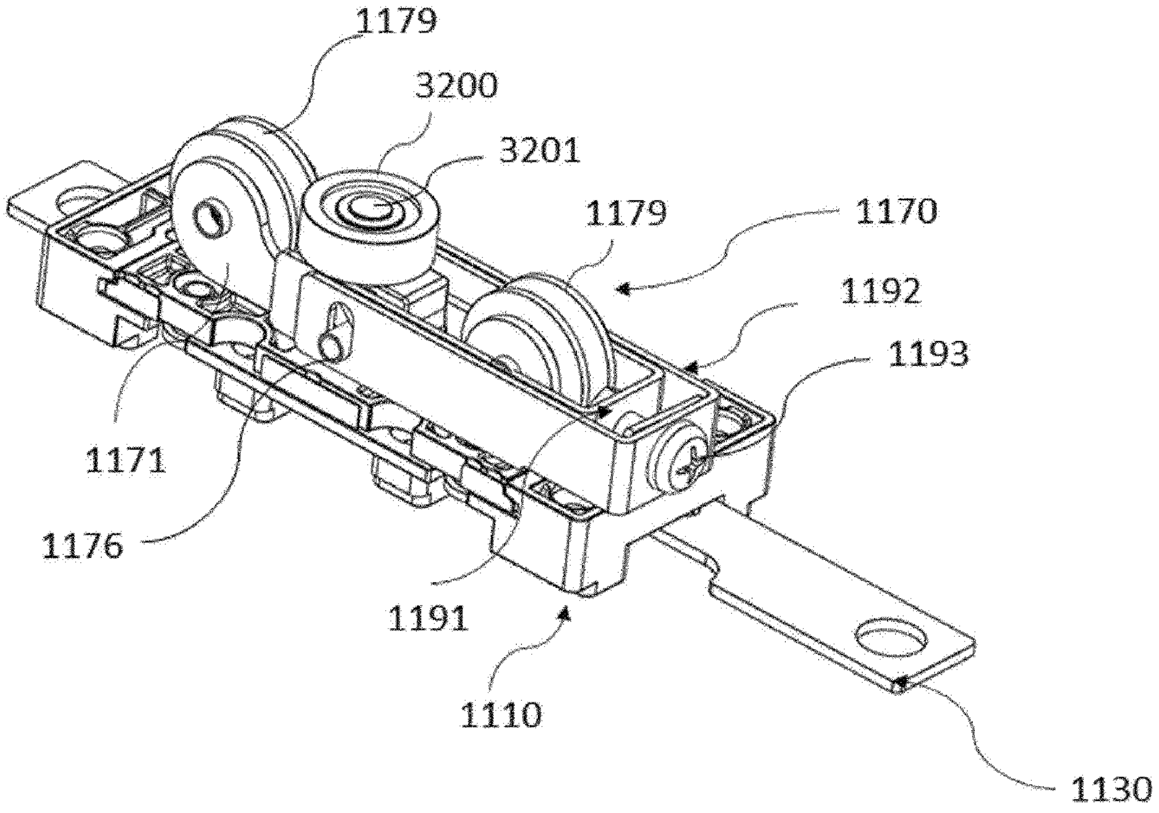
Figure 16:
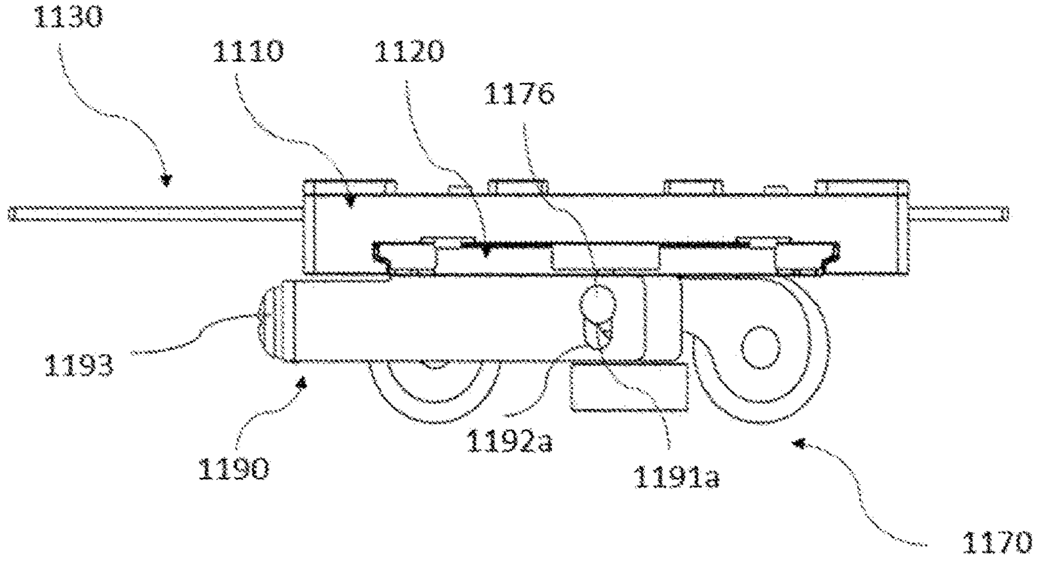
FIG. 16 is a side view of a horizontal movement device of a window assembly according to the present disclosure.
Figure 17:
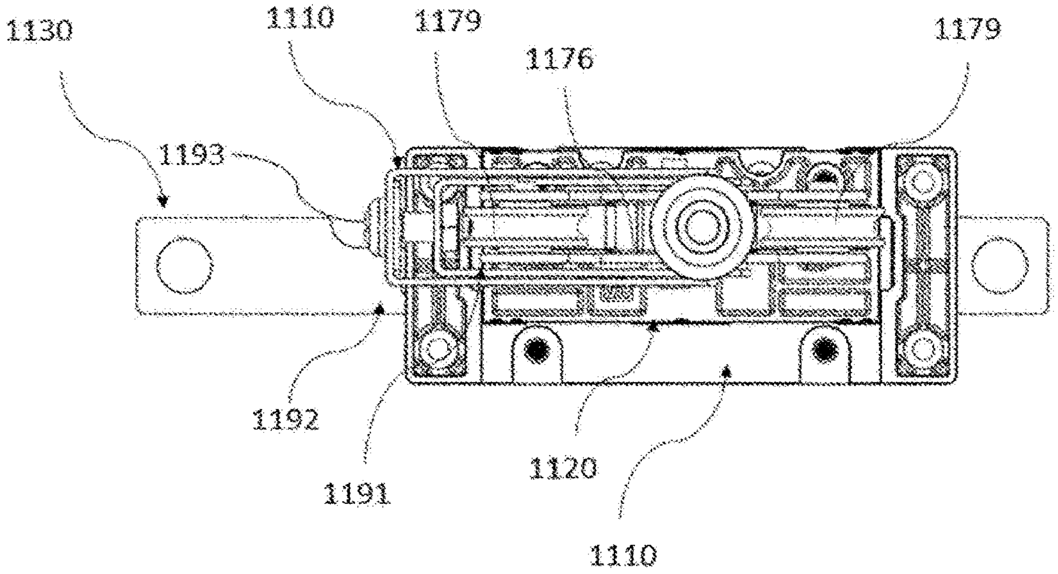
FIG. 17 is a bottom view of a horizontal movement device of a window assembly according to the present disclosure.

That is, in the state of FIGS. 15 and 16, when the inner housing 1191 approaches the outer housing 1192 by turning the adjustment screw 1193, the support shaft 1176 is located in a lower region of a middle slope of the inclined guidance groove 1191*a*, and descends down along the vertical guidance groove 1192*a*.

As a result, a distance between the fixing plate 1120/moving plate 1130 and the wheel 1179 increases, and thus the entire height of the horizontal movement device 1100 increases.

Conversely, when the inner housing 1191 moves away from the outer housing 1192 by turning the adjustment screw 1193, the support shaft 1176 is located in an upper region of a middle slope of the inclined guidance groove 1191*a*, and moves upward along the vertical guidance groove 1192*a*.

As a result, the distance between the fixing plate 1120/moving plate 1130 and the wheel 1179 decreases, and thus the entire height of the horizontal movement device 1100 decreases.

Previously, the guide hole 1131 of the linear moving member 1130 has been described to include the linear movement paths 1131*b* and 1131*c* parallel to the movement direction of the linear moving member 1130, and the extended movement path 1131*a* extending from the linear movement paths 1131*b* and 1131*c* and extending in a different direction from the linear movement paths 1131*b* and 1131*c*.

As shown in FIGS. 7 and 10 to 12, the linear movement paths 1131*b* and 1131*c* include the first linear movement paths 1131*b* that communicate with the extended movement path 1131*a* and in which the connection pin 1154 connecting link 1140 and the second link 1150 is positioned when the latch 300 is latched in the lower groove 213 of the latching guide 200, and the second linear movement path 1131*c* that communicate with the first linear movement paths 1131*b* and in which the connection pin 1154 connecting the first link 1140 and the second link 1150 is located when the latch 300 is released from the latching guide 200.

When the connection pin 1128 is on the extended movement path 1131*a*, the connection pin 1128 is in a horizontal close-fitting state and a closed state or mode, and the end 41 of the handle 40 faces downward (refer to FIG. 1).

When the connection pin 1128 is on the first linear movement paths 1131*b*, the connection pin 1128 is in a horizontal close-fitting release state or an openable state or mode, and the end 41 of the handle 40 faces in a horizontal direction.

When the connection pin 1128 is on the second linear movement path 1131*c*, the connection pin 1128 is in a horizontal close-fitting release state or a ventilated state, and the end of the handle 40 faces upward.

Figure 18:
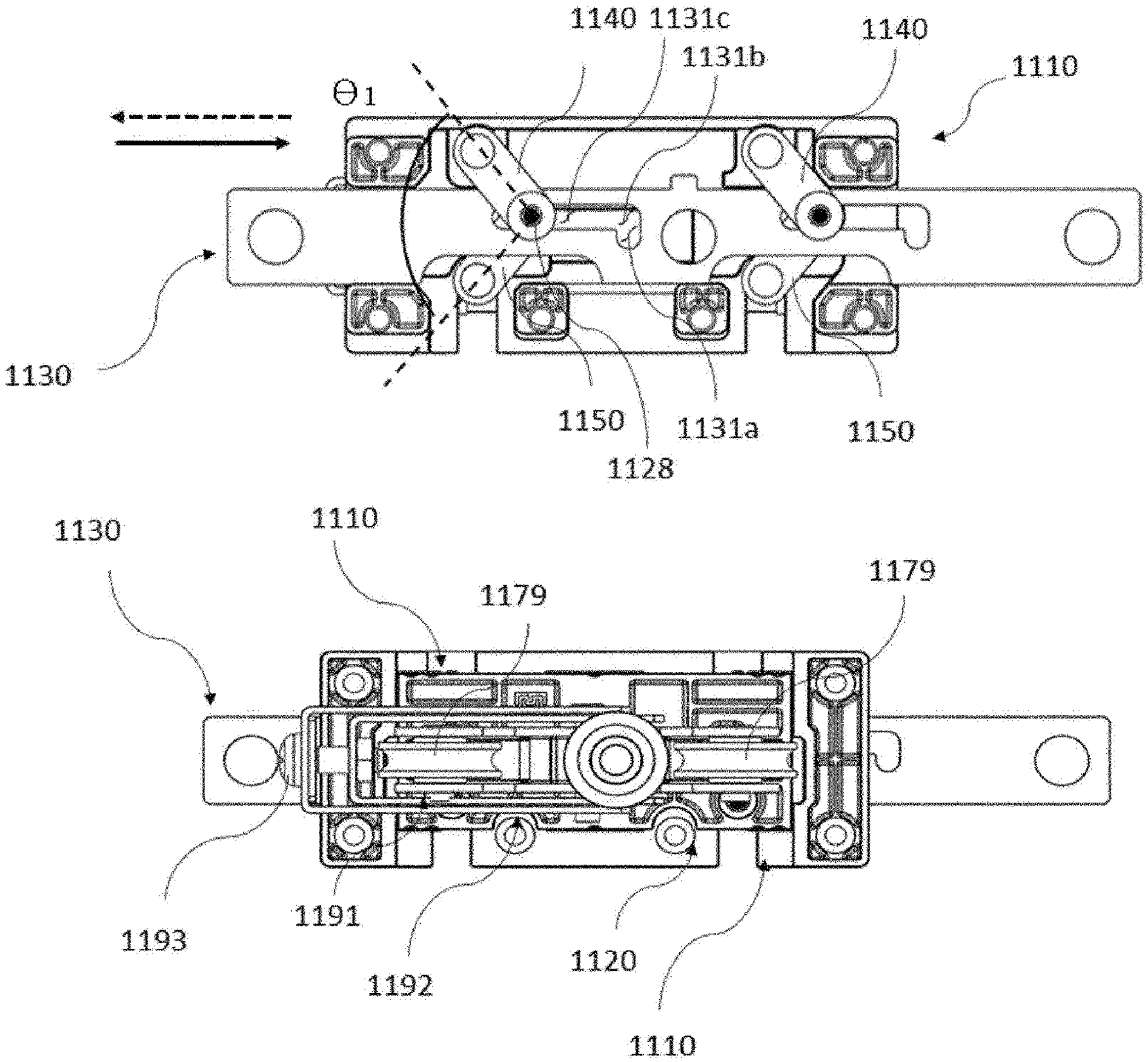
FIG. 18 is a state diagram of a horizontal movement device in a ventilation mode in a window assembly according to the present disclosure.

As shown in FIG. 18, when a user rotates the handle 40 by 180 degrees from top to bottom while a window is ventilated, the linear moving member 1130 moves in a direction of an arrow (dotted line).

Figure 20:
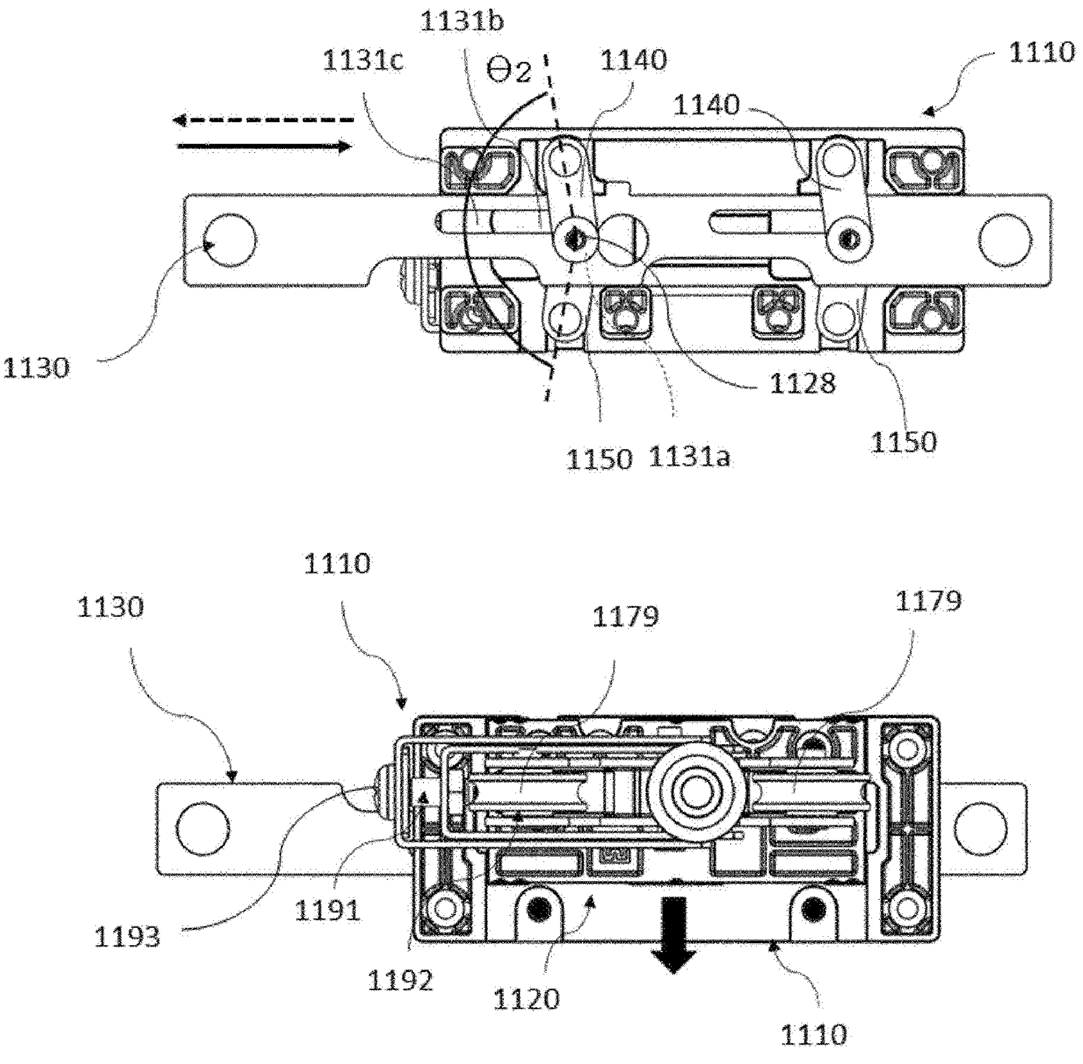
FIG. 20 is a state diagram of a horizontal movement device in a close mode in a window assembly according to the present disclosure.

In this case, as shown in FIG. 20, as the linear moving member 1130 moves, the connection pin 1128 connecting the first link 1140 and the second link 1150 is guided by the guide hole 1131 of the linear moving member 1130, and moves in a movement direction of the linear moving member 1130 to be positioned on the extended movement path 1131*a*, and an operation angle θ2 of the first link 1140 and the second link 1150 increases, and thus the moving plate 1120 and the fixing plate 1110 move relatively far apart from each other.

When the moving plate 1120 and the fixing plate 1120 move relatively far apart from each other, since the moving plate 1120 is connected to the rail of the window frame by the moving part 1178 described above, the fixing plate 1110 close-fits to the window frame 20 (state of FIG. 3).

The vertical operation bar 32 is raised to the maximum, and accordingly, the latch 300 is also raised to the maximum, and is latched in the first latching groove 203*d* of the first latching region 203 of the latching guide 200 (states of FIGS. 6(*a*) and 7(*a*)). This may be defined as a first position.

Figure 19:
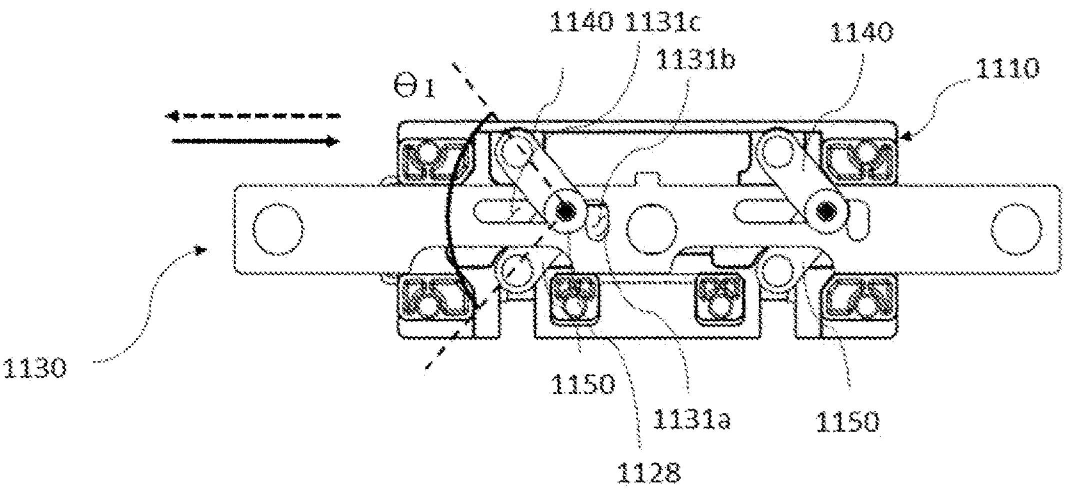
FIG. 19 is a state diagram of a horizontal movement device in an openable mode in a window assembly according to the present disclosure.
Figure 19:
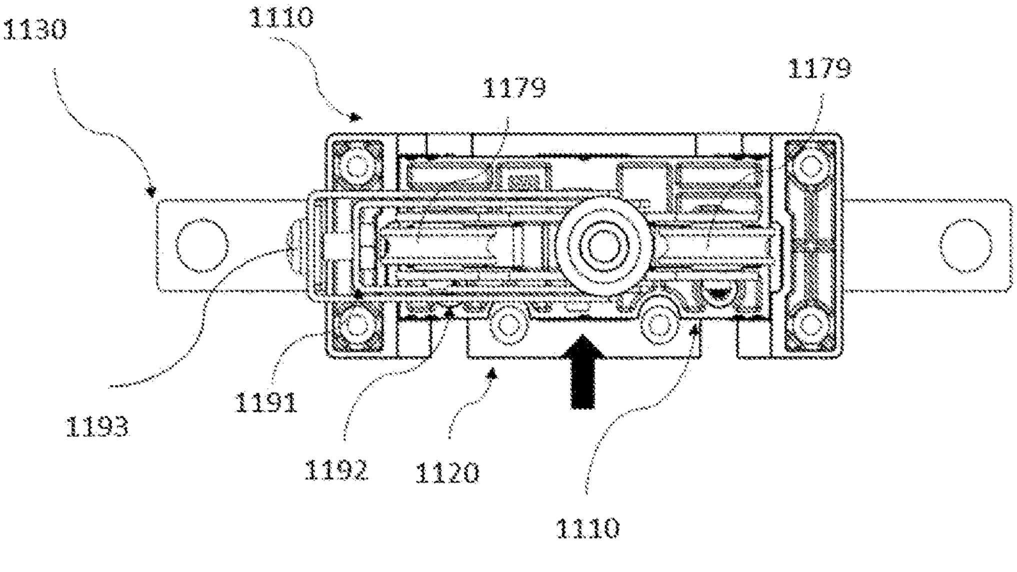

In this state, in order for a user to utilize an openable mode, in the state of FIG. 20, when the handle 40 is rotated upward by 90 degrees and the handle 40 is placed in a horizontal state, the linear moving member 1130 may move in a direction indicated by an arrow (solid line), as shown in FIG. 19.

In this case, the connection pin 1128 deviate from the extended movement path 1131*a* of the linear moving member 1130 and is located on the first linear movement path 1131*b*. In addition, the operation angle 81 of the first link 1140 and the second link 1150 decreases, and thus the moving plate 1120 and the fixing plate 1110 move relatively to get closer.

When the moving plate 1120 and the fixing plate 1110 get closer, since the moving plate 1120 is connected to the rail of the window frame by the moving part 1178 described above, the fixing plate 1110 separates from the window frame (state of FIG. 2).

Then, the vertical operation bar 32 is slightly lowered than in a closed state, and accordingly, the latch 300 is located in the separation space S beyond the first latching region 203 of the latching guide 200. Therefore, the window becomes an openable state (state of FIG. 6(*b*) and FIG. 7(*b*)). This may be defined as a second position. In this state, since the latch 300 is not constrained by the latching guide 200, the window 30 may slide freely and open.

In this state, in order for the user to utilize a ventilation mode, in the state of FIG. 19, when the handle 40 is rotated upward by 90 degrees such that the end 41 of the handle faces upward, the linear moving member 1130 moves in a direction indicated by an arrow (solid line) as shown in FIG. 18.

In this case, the connection pin 1128 deviate from the first linear movement paths 1131*b* and is positioned on the second linear movement path 1131*c*. The operation angle 81 of the first link 1140 and the second link 1150 is the same as an openable mode state, and release of the horizontal close-fitting state is also maintained (refer to FIG. 2).

Then, the vertical operation bar 32 is lowered compared with an openable mode state, and accordingly, the latch 300 moves lower than a position in the separation space S, and enters the second latching region 204 (states of FIGS. 6(*c*) and 7(*c*)). This may be defined as a third position.

Therefore, in this state, since the latch 300 is latched in the second latching region 204 and movement in a sliding direction is restricted, the window 30 is not open and the horizontal close-fitting state is released, and thus ventilation is possible.

As described above, the present disclosure has been described with reference to the embodiments shown in the drawings, but this is only for explaining the disclosure, and one of ordinary skill in the art to which the present disclosure belongs would understand that various modifications or equivalent embodiments are possible from the detailed description of the present disclosure.

Therefore, the authentic scope of the present disclosure needs to be determined by the technical spirit of the claims.

The invention claimed is:

1. A window assembly having a ventilation function and a horizontal close-fitting function, comprising:

a window sash;

a window frame in which the window sash is installed to slide;

a handle rotatably installed on the window sash;

a latch provided on a side surface of the window sash and operatively connected to movement of the handle to move in up and down directions;

a latching guide that is provided on the window frame at a relative position facing the latch and by which the latch is or is not latched depending on a position of the latch; and a horizontal movement device provided on at least one of a top surface or a bottom surface of the window sash and operatively connected to the handle to cause horizontal close-fitting or horizontal close-fitting release of the window sash depending on movement of the handle, wherein the latching guide includes a first latching region positioned at an upper part, a second latching region located lower than the first latching region while being spaced apart from the first latching region, and a separation space provided between the first latching region and the second latching region, wherein a vertical central line of the first latching region and a vertical central line of the second latching region are displaced from each other, and when the latch is located in the first latching region or the second latching region, horizontal close-fitting or horizontal close-fitting release of the window frame is inducted, and when the latch is located in the separation space, the window sash is slidably moveable with respect to the window frame, wherein the first latching region includes a first side wall part that is open downward and forward, and a first edge part that extends from an edge of the first side wall part and by which the latch is latched, wherein the second latching region includes a second side wall part that is open upward and forward, and a second edge part that extends from an edge of the second side wall part and by which the latch is latched.

2. The window assembly of claim 1, wherein an open part of a lower part of the first latching region extends to one side and guides the latch out of the first latching region to move toward the second latching region.

3. The window assembly of claim 1, wherein:

a direction in which the first latching region is biased corresponds to a direction in which the window sash is close-fit to the window frame, and when the latch is positioned in and latched by a first latching groove in the first latching region, the window sash is close-fit to the window frame and becomes in a closed state, and the handle is positioned downward; and a direction in which the second latching region is biased corresponds to a direction in which the window sash is separated from the window frame, and when the latch is positioned in a second latching groove in the second latching region, a close-fitting state of the window sash is released from the window frame, a fine gap is formed between a side surface of the window sash and a side surface of the window frame, the latch is latched in the second latching region to prevent opening, and the handle is positioned upward.

4. The window assembly of claim 1, wherein, when the latch is positioned in the separation space between the first latching region and the second latching region, the handle is disposed in parallel to a ground, the latch is not interfered with the first latching region or the second latching region, and a window is slidably moveable along the window frame.

5. The window assembly of claim 1, wherein the horizontal movement device includes:

a fixing plate;

a moving plate disposed to be relatively movable to the fixing plate in a horizontal direction in which a window is close-fit to or separated from the window frame, and including a moving part installed moveably along a rail of the window frame;

a linear moving member connected to the fixing plate and linearly moving by a predetermined distance by movement of an operation bar connected to the handle of the window; and a pair of operation links horizontally moving the moving plate with respect to the fixing plate according to linear movement of the linear moving member, wherein, in the linear moving member, an operation hole into which an operation pin of the operation bar is inserted and that moves the linear moving member immediately when the handle is rotated, and a guide hole into which a connection pin connecting the operation links is inserted and that guides movement of the connection pin by movement of the linear moving member are formed, wherein, as the latch and the latching guide are latched, when a close-fitting state of the window is released with respect to the window frame by the horizontal movement device, ventilation is possible through a gap between the window and the window frame, the window restrictedly moves to form the gap, and free opening of the window is prevented, wherein the operation link includes:

a first link having an end connected to the fixing plate and a remaining end connected to the linear moving member, and disposed inclined at a predetermined operation angle with respect to a linear movement direction of the linear moving member, the operation angle being changed according to linear movement of the linear moving member; and a second link disposed symmetrically with the first link and having an end connected to the moving plate and a remaining end connected to the linear moving member, and wherein the guide hole includes a linear movement path in parallel to a movement direction of the linear moving member, and an extended movement path extending from the linear movement path and extending in a different direction from the linear movement path.

6. The window assembly of claim 5, wherein the linear movement path includes:

a first linear movement path that communicates with the extended movement path and on which a connection pin connecting the first link and the second link is positioned in a state in which the latch is latched in a lower groove of the latching guide; and a second linear movement path that communicates with the first linear movement path and on which the connection pin connecting the first link and the second link is positioned in a state in which latching between the latch and the latching guide is released.

7. The window assembly of claim 5, further comprising:

a moving part provided on the moving plate and including a plurality of wheels; and a height adjuster provided on the moving plate to adjust a height of the moving part, wherein the height adjuster includes:

an inner housing surrounding the moving part and including an inclined guide hole into which a fixed shaft disposed through the moving part is inserted;

an outer housing that surrounds the inner housing, into which the fixed shaft is inserted, and that includes a vertical guide hole formed in up and down directions; and a height adjustment screw that connects the inner housing and the outer housing by a screw, adjusts a distance between the inner housing and the outer housing, and adjusts the height of the moving part by adjusting a vertical height of the fixed shaft inserted into the inclined guide hole and the vertical guide hole.

8. A window assembly having a ventilation function and a horizontal close-fitting function, comprising:

a window sash;

a window frame in which the window sash is installed to slide;

a handle rotatably installed on the window sash;

a latch provided on a side surface of the window sash and operatively connected to movement of the handle to move in up and down directions;

a latching guide that is provided on the window frame at a relative position facing the latch and by which the latch is or is not latched depending on a position of the latch; and a horizontal movement device provided on at least one of a top surface or a bottom surface of the window sash and operatively connected to the handle to cause horizontal close-fitting or horizontal close-fitting release of the window sash depending on movement of the handle, wherein the latching guide includes a first latching region positioned at an upper part, a second latching region located lower than the first latching region while being spaced apart from the first latching region, and a separation space provided between the first latching region and the second latching region, wherein a vertical central line of the first latching region and a vertical central line of the second latching region are displaced from each other, and when the latch is located in the first latching region or the second latching region, horizontal close-fitting or horizontal close-fitting release of the window frame is inducted, and when the latch is located in the separation space, the window sash is slidably moveable with respect to the window frame, wherein a direction in which the first latching region is biased corresponds to a direction in which the window sash is close-fit to the window frame, and when the latch is positioned in and latched by a first latching groove in the first latching region, the window sash is close-fit to the window frame and becomes in a closed state, and the handle is positioned downward, wherein a direction in which the second latching region is biased corresponds to a direction in which the window sash is separated from the window frame, and when the latch is positioned in a second latching groove in the second latching region, a close-fitting state of the window sash is released from the window frame, a fine gap is formed between a side surface of the window sash and a side surface of the window frame, the latch is latched in the second latching region to prevent opening, and the handle is positioned upward.

9. A window assembly having a ventilation function and a horizontal close-fitting function, comprising:

a window sash;

a window frame in which the window sash is installed to slide;

a handle rotatably installed on the window sash;

a latch provided on a side surface of the window sash and operatively connected to movement of the handle to move in up and down directions;

a latching guide that is provided on the window frame at a relative position facing the latch and by which the latch is or is not latched depending on a position of the latch; and a horizontal movement device provided on at least one of a top surface or a bottom surface of the window sash and operatively connected to the handle to cause horizontal close-fitting or horizontal close-fitting release of the window sash depending on movement of the handle, wherein the latching guide includes a first latching region positioned at an upper part, a second latching region located lower than the first latching region while being spaced apart from the first latching region, and a separation space provided between the first latching region and the second latching region, wherein a vertical central line of the first latching region and a vertical central line of the second latching region are displaced from each other, and when the latch is located in the first latching region or the second latching region, horizontal close-fitting or horizontal close-fitting release of the window frame is inducted, and when the latch is located in the separation space, the window sash is slidably moveable with respect to the window frame, wherein the horizontal movement device includes:

a fixing plate;

a moving plate disposed to be relatively movable to the fixing plate in a horizontal direction in which a window is close-fit to or separated from the window frame, and including a moving part installed moveably along a rail of the window frame;

a linear moving member connected to the fixing plate and linearly moving by a predetermined distance by movement of an operation bar connected to the handle of the window; and a pair of operation links horizontally moving the moving plate with respect to the fixing plate according to linear movement of the linear moving member, wherein, in the linear moving member, an operation hole into which an operation pin of the operation bar is inserted and that moves the linear moving member immediately when the handle is rotated, and a guide hole into which a connection pin connecting the operation links is inserted and that guides movement of the connection pin by movement of the linear moving member are formed, wherein, as the latch and the latching guide are latched, when a close-fitting state of the window is released with respect to the window frame by the horizontal movement device, ventilation is possible through a gap between the window and the window frame, the window restrictedly moves to form the gap, and free opening of the window is prevented, wherein the operation link includes:

a first link having an end connected to the fixing plate and a remaining end connected to the linear moving member, and disposed inclined at a predetermined operation angle with respect to a linear movement direction of the linear moving member, the operation angle being changed according to the linear movement of the linear moving member; and a second link disposed symmetrically with the first link and having an end connected to the moving plate and a remaining end connected to the linear moving member, wherein the guide hole includes a linear movement path in parallel to a movement direction of the linear moving member, and an extended movement path extending from the linear movement path and extending in a different direction from the linear movement path.

* * * * *